United States Patent
Kupershmidt et al.

(10) Patent No.: US 7,853,739 B1
(45) Date of Patent: Dec. 14, 2010

(54) METHOD AND SYSTEM FOR TRANSMITTING USB COMMUNICATION

(75) Inventors: Haim Kupershmidt, Or Yehuda (IL); Pavel Smirnov, Ramat Gan (IL); Ran Hay, Rosh Ha'Ayin (IL); Gadi Shor, Tel Aviv (IL)

(73) Assignee: Wisair Ltd., Tel Aviv (IL)

(*) Notice: Subject to any disclaimer, the term of this patent is extended or adjusted under 35 U.S.C. 154(b) by 517 days.

(21) Appl. No.: 11/942,016

(22) Filed: Nov. 19, 2007

(51) Int. Cl.
*G06F 3/00* (2006.01)
*G06F 13/20* (2006.01)

(52) U.S. Cl. .................. 710/60; 710/313; 710/110; 710/29; 709/232

(58) Field of Classification Search .......... 170/29, 170/58–64, 110–114, 305–313; 709/232–206
See application file for complete search history.

(56) References Cited

U.S. PATENT DOCUMENTS

| | | | | |
|---|---|---|---|---|
| 7,565,467 B2 * | 7/2009 | Nagase | .............. | 710/62 |
| 7,584,313 B1 * | 9/2009 | Hay et al. | .............. | 710/62 |
| 7,610,410 B2 * | 10/2009 | Uehara | .............. | 710/9 |
| 2005/0144334 A1 * | 6/2005 | Hamdi et al. | .............. | 710/15 |
| 2006/0123181 A1 * | 6/2006 | Aull et al. | .............. | 710/310 |
| 2006/0179144 A1 * | 8/2006 | Nagase | .............. | 709/226 |
| 2007/0038784 A1 * | 2/2007 | Sung et al. | .............. | 710/56 |
| 2008/0215774 A1 * | 9/2008 | Kim et al. | .............. | 710/62 |
| 2008/0250173 A1 * | 10/2008 | Ueda | .............. | 710/63 |

* cited by examiner

*Primary Examiner*—Christopher B Shin
(74) *Attorney, Agent, or Firm*—Reches Patents

(57) ABSTRACT

A universal serial bus (USB) communication system, the system includes: (a) a wired communication component, which is adapted to receive a received USB transfer; (b) a processor which is adapted to process the received USB transfer to provide a transmittable wireless USB transfer; and (c) a wireless communication component, which is adapted to transmit the transmittable wireless USB transfer; wherein the system is adapted to transmit a portion of the transmittable wireless USB transfer before the entire received USB transfer is received.

25 Claims, 17 Drawing Sheets

US 7,853,739 B1

METHOD AND SYSTEM FOR TRANSMITTING USB COMMUNICATION

FIELD OF THE INVENTION

The invention relates to methods and systems for transmitting USB communication.

BACKGROUND OF THE INVENTION

The standard (wired) USB protocol differs from wireless USB protocols in the standardization of both the physical and the logical aspects of communication. Several adaptations are needed in order to allow a USB function that was designed for wired communication to use wireless communication. Some of those adaptations are physical and require a hardware solution, whereas other needed adaptations are logical and require a software solution.

Conveniently, in order to facilitate a communication between such a USB function and a wireless host, the communication is mediated by a device wire adapter (DWA) which is connected to the USB function, and a host wire adapter (HWA) which is connected to the host. However, since the USB function is designed according to the wired standard, the use of the wireless channel in such a situation is not efficient, wherein the wireless channel is not used for relatively long periods of time.

An example for such an inefficiency is when either the HWA or the DWA are waiting for an entire transfer to be received, before transferring it to the other party. During the wait for the transfer to be fully received, the wireless channel is not used for the transfer of data. Since the bandwidth of the wireless channel is a major constrain on the communication, it is clear to a person who is skilled in the art, that using the wireless channel more efficiently, and especially in a more streaming manner, would benefit the communication.

FIG. 1a illustrates flow of bulk data in a prior art standard transmission of data from a host to a USB function. A transfer of data is transmitted from a device class driver of the host to a DWA driver of the host (the transfer of data is denoted 610. It is noted that the notation of bracketed numerals used in the description of FIGS. 1a and 1b represents data flows). The DWA driver, which is included in the host, than transmit request of transfer (612. It is noted that conveniently, some or all of the requests of transfer which are used in the invention are transfer requests, as standardly known in the art) to the DWA, via the HWA driver. In order to transmit request of transfer 612, the HWA drivers transmits HWA driver request of transfer 614 to the HWA via the USB host, and than transmits data 616, which includes request of transfer 612, which is interpreted by the HWA. As a result of this, data which follows request of transfer 616 is transmitted (618) to the DWA. The DWA reply with an approving 620 which is transmitted back in the steps of notifying, responding and transmission which are denoted as 622, 624, 626 and 628 which are clear to a person who is skilled in the art (and wherein TNotif denotes a notification and TRes denotes a result indicating that the transmission succeeded).

After stage 601 of requesting is over, the transmission of data continues with stage 602 of transmitting data to the HWA. The DWA driver transmit data 630 to the HWA driver, wherein the HWA drivers transmits another HWA driver request of transfer 632, followed by packets of data 634, via the USB host to the HWA. Only after receiving the entire data transfer, the HWA wirelessly transmits wireless data packets 636 to the DWA. Once the entire transfer of data was transmitted, the DWA acknowledges (638) and transfers bulk data packets 640 to the USB function. Upon receiving acknowledgement 638, the HWA transmits back a result of transfer, wherein stages 642 through 648 are similar to the aforementioned stages 622 through 628.

Once the USB function receives the last bulk data packet 640 it acknowledges it 650, thus implicitly acknowledging a successful receive of the transfer, following which the DWA issues a notification 652 which is transferred during stage 603, which includes stages similar to the aforementioned stages 622 through 628, so as to transfer notification 654 to the DWA driver. In response to request 656, the DWA replies with result of transmission 658 which is transmitted back during stage 604 as result of transmission 660 to the DWA driver, and from the DWA driver back (662) to the device class driver, in order to conclude the transfer.

It is noted that in the illustrated flow of bulk data in a prior art standard transmission of data from a host to a USB function, between the times $T(n)691$, in which the HWA receives the first packet of data 634, and $T(n)692$, in which the HWA starts transmitting the first packet of data 636, there is a growing amount of data which is stored in the HWA, whilst the wireless channel between the HWA and the DWA is idle.

It is noted that not all of the different transmissions in FIGS. 1a, 1b, and some of the following figures are detailed is the explanation, as a person skilled in the art is able to understand the functions of the transmissions which are not fully explained, though may be needed for the transmission, and which are familiar to a person who is skilled in the art.

FIG. 1b illustrates flow of bulk data in a prior art standard transmission of data from the USB function to the host. The device class driver issues a request for data to the USB function, via the DWA driver. The DWA driver, which is included in the host, than transmits request of transfer (712) to the DWA, via the HWA driver. In order to transmit request of transfer 712, the HWA drivers transmits HWA driver request of transfer 714 to the HWA via the USB host, and than transmits data 716, which includes request of transfer 712, which is interpreted by the HWA and transmitted as request of transfer 718 to the DWA. The DWA replies with an approving 720 which is transmitted back in the steps of notifying, responding and transmission which are denoted as 722, 724, 726 and 728 which are clear to a person who is skilled in the art (and wherein TNotif denotes a notification and TRes denotes a result indicating that the transmission succeeded).

After the USB function receives request of transfer 730 from the DWA, it starts sending the transfer of data to the DWA, in one or more (usually multiple) data packets 732. After the DWA receives the last data packet 732, it issues notification 734 which is then transferred as notification 736 to the DWA driver, in stage 702 which is clear to a person who is skilled in the art. The data flow than continues with transmitting a result of transfer from the DWA to the DWA driver (703) in response to a request of the DWA. Only after stages 702 and 703 of notifying and providing of result are carried out, request for transfer 738 is transmitted to the DWA, which then wirelessly transmit the data transfer in one or more wireless date packets 740 to the HWA. From the HWA the data is transferred in a standard manner, of which a person who is skilled in the art is familiar, to the HWA driver (704) and from the HWA driver, through the DWA driver to the device class driver (742 and 744).

It is noted that in the illustrated flow of bulk data in a prior art standard transmission of data from the USB function to the host, between the times $T(n)791$, in which the DWA receives the first packet of data 732, and $T(n)792$, in which the DWA starts transmitting the first packet of data 740, there is a growing amount of data which is stored in the DWA, whilst the wireless channel between the HWA and the DWA is practically idle (barring the data transmissions denoted as 734 and 737).

Moreover, between the times T(n)793, in which the DWA receives the last packet of data 732 and T(n)792, all the data transfer is received by the DWA, and yet the wireless channel is practically idle.

It is therefore desired to have reliable and efficient means of wirelessly transmitting USB communication.

SUMMARY OF THE INVENTION

A universal serial bus (USB) communication system, the system includes: (a) a wired communication component, which is adapted to receive a received USB transfer; (b) a processor which is adapted to process the received USB transfer to provide a transmittable wireless USB transfer; and (c) a wireless communication component, which is adapted to transmit the transmittable wireless USB transfer; wherein the wireless communication component is adapted to transmit a portion of the transmittable wireless USB transfer before the entire received USB transfer is received.

A method for wirelessly transmitting USB communication, the method includes: (a) receiving a received USB transfer by wired communication; (b) processing the received USB transfer to provide a transmittable wireless USB transfer; and (c) transmitting the transmittable wireless USB transfer by wireless communication; wherein at least a portion of the transmittable wireless USB transfer is transmitted before a completion of a reception of the received USB transfer.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

The following descriptions of the drawings include both descriptions of systems for connecting a wireless USB host and a wired USB function, according to different embodiments of the invention, and methods for connecting the wireless USB host to the wired USB function. It will be appreciated by a person skilled in the art that considering the entire disclosure of both the systems and the methods may enhance the clarity of the descriptions. It is further noted, however, that both the systems and the method could be practiced independently, and that the different disclosures should be considered both as stand alone disclosures and as a whole.

Figure 2:
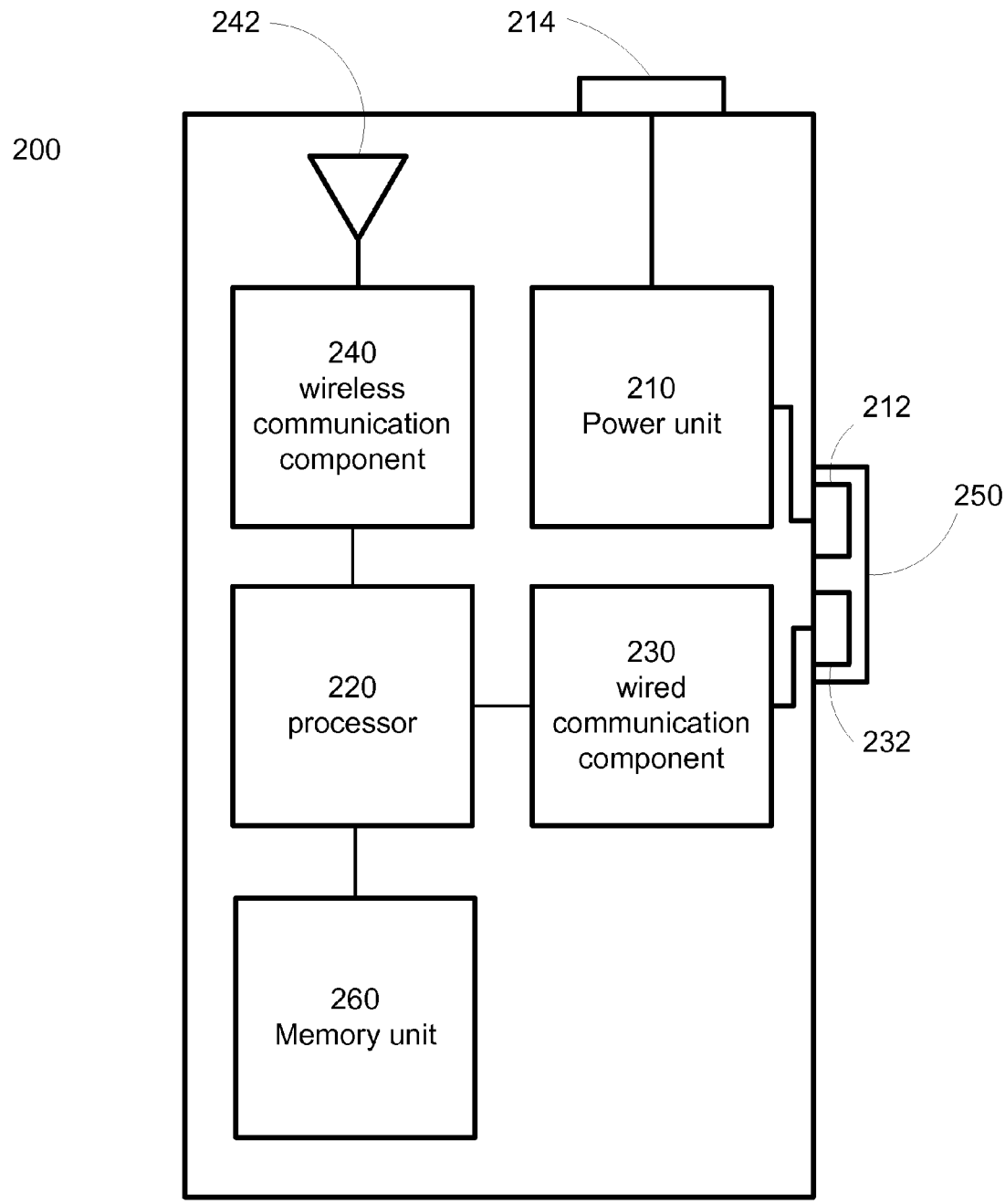
FIG. 2 illustrates a universal serial bus (USB) communication system according to an embodiment of the invention.

FIG. 2 illustrates universal serial bus (USB) communication system 200 according to an embodiment of the invention, which includes: (a) wired communication component 230, which is adapted to receive a received USB transfer; (b) processor 220 which is adapted to process the received USB transfer to provide a transmittable wireless USB transfer; (c) wireless communication component 240, which is adapted to transmit the transmittable wireless USB transfer; wherein wireless communication component 240 is adapted to transmit a portion of the transmittable wireless USB transfer before the entire received USB transfer is received.

As will be elucidated and detailed further ahead, some important embodiments of the invention are host wire adaptors (HWAs) whereas some other important embodiments of the invention are device wire adaptors (DWAs). Since it is often desirable to provide wireless USB communication for USB devices and for USB host which are not native USB devices or hosts, it is possible to connect a DWA to a USB device and/or to connect a HWA to a USB host, and so to provide the USB device and/or to the USB host wireless USB communication capabilities.

It is clear to a person who is skilled in the art that in embodiments of the invention wherein USB communication system 200 is a DWA, the received USB transfer is conveniently received from the USB device to which USB communication system 200 provides wireless communication capabilities, and the transmittable wireless USB transfer is conveniently transmitted to a USB host, be it a native wireless USB host, or a USB host to which a HWA is connected. It should be noted that in such embodiment of the invention, the direction which is herein described in conveniently an incoming communication, from the USB device to the host.

Similarly, in embodiments of the invention wherein USB communication system 200 is a HWA, the received USB transfer is conveniently received from the USB host to which USB communication system 200 provides wireless communication capabilities, and the transmittable wireless USB transfer is conveniently transmitted to a USB device, be it a native wireless USB device, or a USB device to which a DWA is connected. It should be noted that in such embodiment of the invention, the direction which is herein described in conveniently an out-going communication, from the host to the USB device.

It is noted that, according to an embodiment of the invention, the received USB transfer is a bulk transfer, wherein the processor is conveniently adapted to process a received bulk transfer, wherein conveniently the transmittable wireless USB transfers is also a bulk transfers.

It is clear to any person who is skilled in the art that different embodiments of the invention are beneficial for bulk transfers, as bulk transfers are used for large amounts of data, and the expediting of those transfers makes data transfers over the wireless channel more quick and efficient. With that, different embodiments of the invention are also beneficial for other types of transfers. For example, for asynchronous transfers, employing the teaching of the invention shorten latencies in communication. The shortening of latencies is evidently also beneficial in transfers other than asynchronous transfers.

Conveniently, system 200 further includes power unit 210, which, according to an embodiment of the invention, is adapted to receive power from an external power source via first power interface 214, and, according to an embodiment of the invention, to provide power to a USB function (or, according to another embodiment of the invention, to receive power from the USB Host) via second power interface 212.

It is noted that conveniently, wired communication component 230 is adapted to both receive and transmit data over a wired data channel, via wired communication interface 232, which may and may not be implemented in unified interface 250 together with second power interface 212. It is noted that according to an embodiment of the invention, one or more of second power interface 212, wired communication interface 232 and unified interface 250 is a standard USB interface.

It is noted that conveniently, wireless communication component 240 is adapted to both receive and transmit data wirelessly over a wireless data channel, via antenna 242 which is connected to wireless communication component 240.

FIGS. 3*a* through 3*d* illustrate flow of data in a transmission of data from the host to the USB function, according to different embodiments of the invention. It is noted that considering one or more of FIGS. 3*a* through 3*d* and the explanations which are offered for said figures in regard to FIG. 1*a* and to the explanation which is offered for FIG. 1*a*. may benefit the clear comprehension of FIGS. 3*a* through 3*d*. It is further noted that similar stages in FIGS. 1*a* and 3*a* through 3*d* are denoted by the same numbers, and thus referring to the explanations pertaining to FIG. 1*a* may further benefit the clear comprehension of FIGS. 3*a* through 3*d*.

Figure 3A:
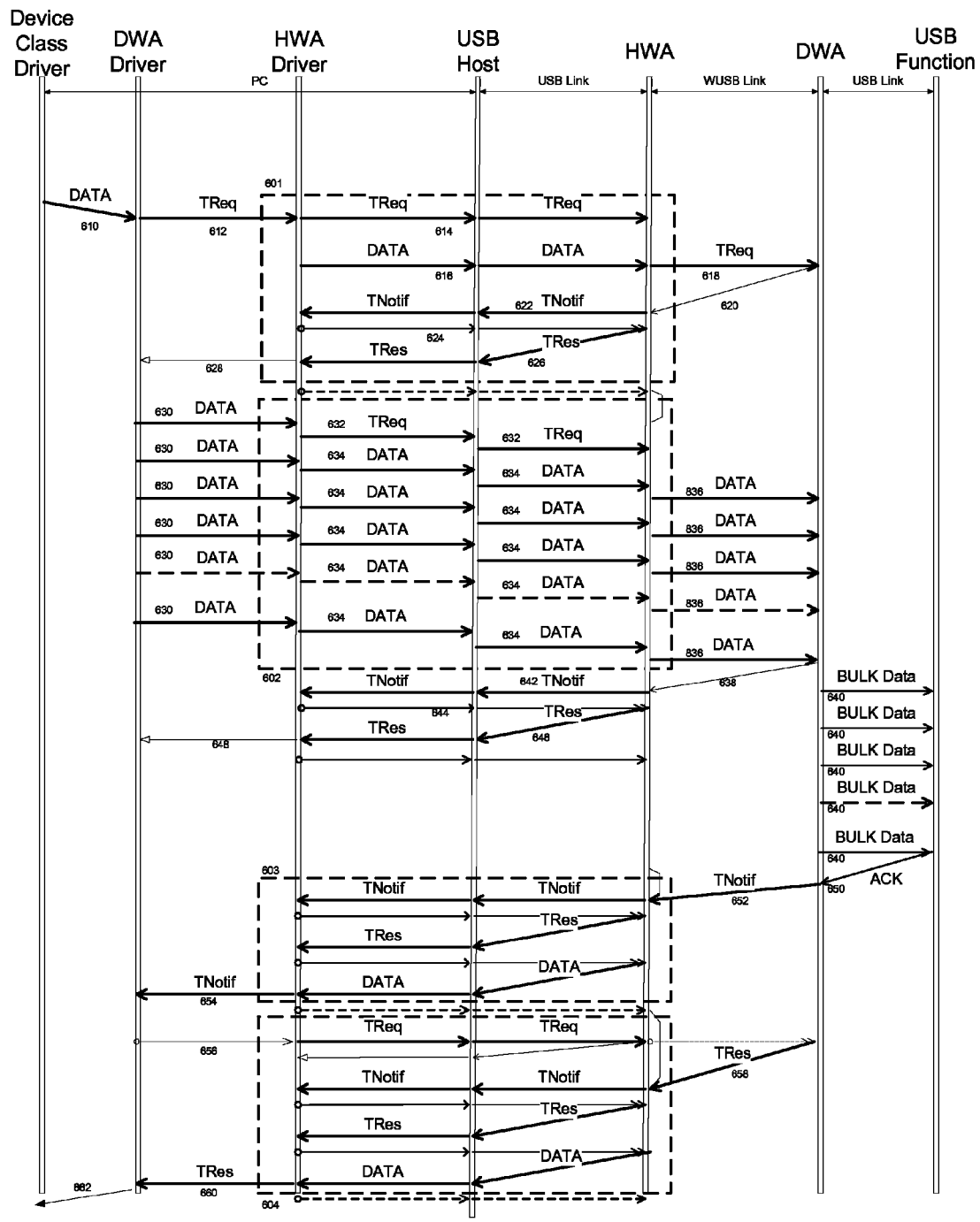
FIGS. 3a, 3b, 3c and 3d illustrate flow of data in a transmission of data from the host to the USB function, according to an embodiment of the invention.

FIG. 3*a* illustrates flow of data, which is conveniently bulk data, in a transmission of data from the host to the USB function, according to an embodiment of the invention.

Figure 1A:
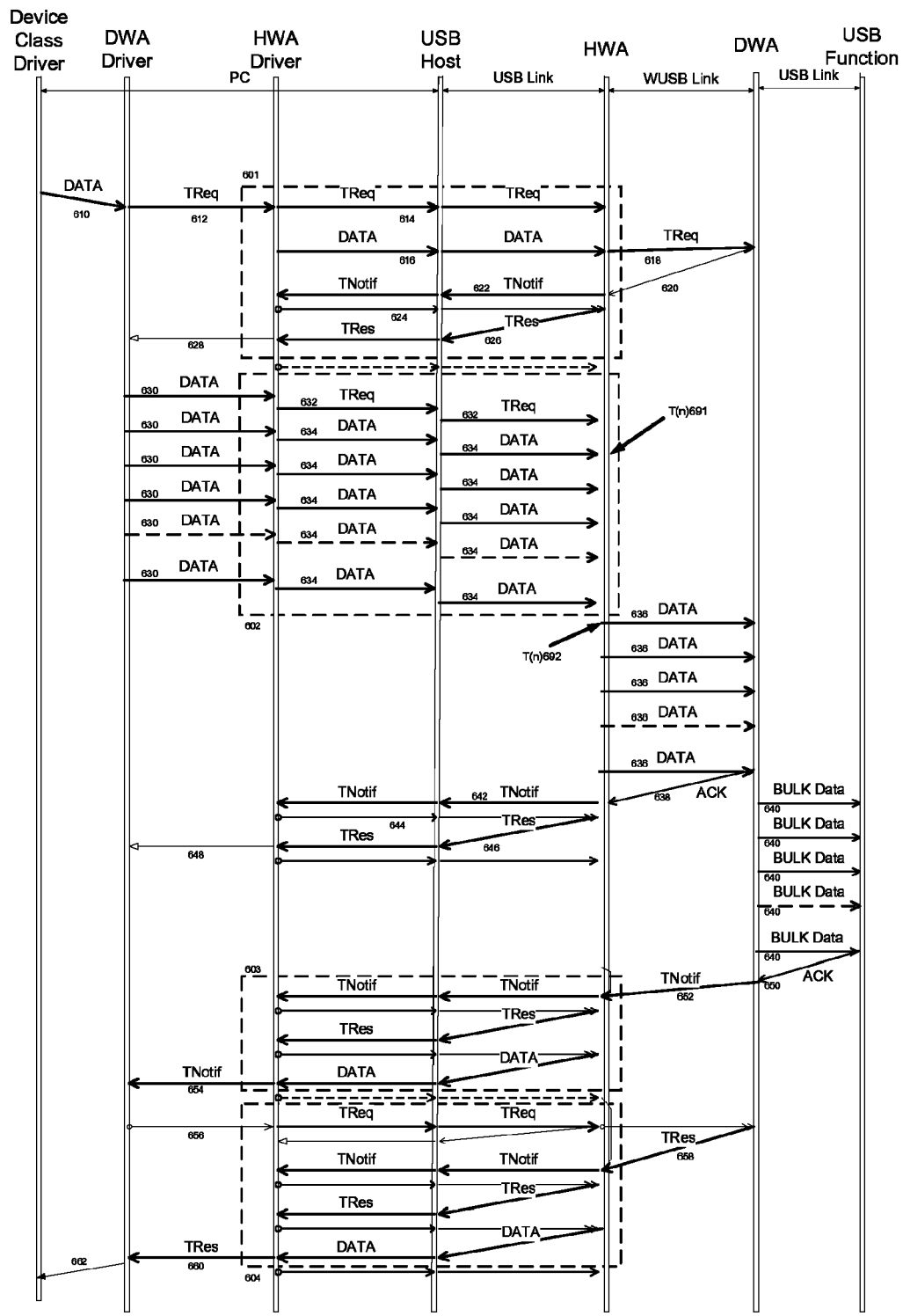
FIG. 1a illustrates a prior art flow of bulk data in a prior art standard transmission of data from a host to a USB function.

Stages 601 and 602, and all the transmissions which are denoted as 610 through 634 are, according to an embodiment of the invention, similar to the corresponding stages and transmissions of FIG. 1*a*.

A processor of the HWA of FIG. 3*a*, which is a host wire adapter according to an embodiment of the invention, is adapted to process a received USB transfer, which is received by way of the multiple data packets 634 by a wired communication component of the HWA, to provide a transmittable wireless USB transfer, which conveniently includes multiple wireless data packets 836. The HWA is adapted to transmit, by a wireless communication component of the HWA, the transmittable wireless USB transfer. Unlike prior art solutions, however, the HWA is adapted to transmit a portion of the transmittable wireless USB transfer (i.e. at least one wireless data packet 836) before the entire received USB transfer (i.e. at least one data packet 634) is received.

It is noted that according to different embodiment of the invention, the HWA is adapted to determine when to starts the transmission of the transmittable wireless USB transfer by applying different decision rules. The determining may be responsive to the amount of received USB transfer which is received, to a size of a buffer which is used to store the received USB transfer, to a usage level of the wireless channel, and so forth.

According to an embodiment of the invention, after the transmission of the transmittable wireless USB transfer from the HWA to the DWA, the transmission of data in continued according to a standard flow of bulk data in a transmission of data from a host to a USB function, such as the one illustrated in FIG. 1*a*.

Figure 3B:
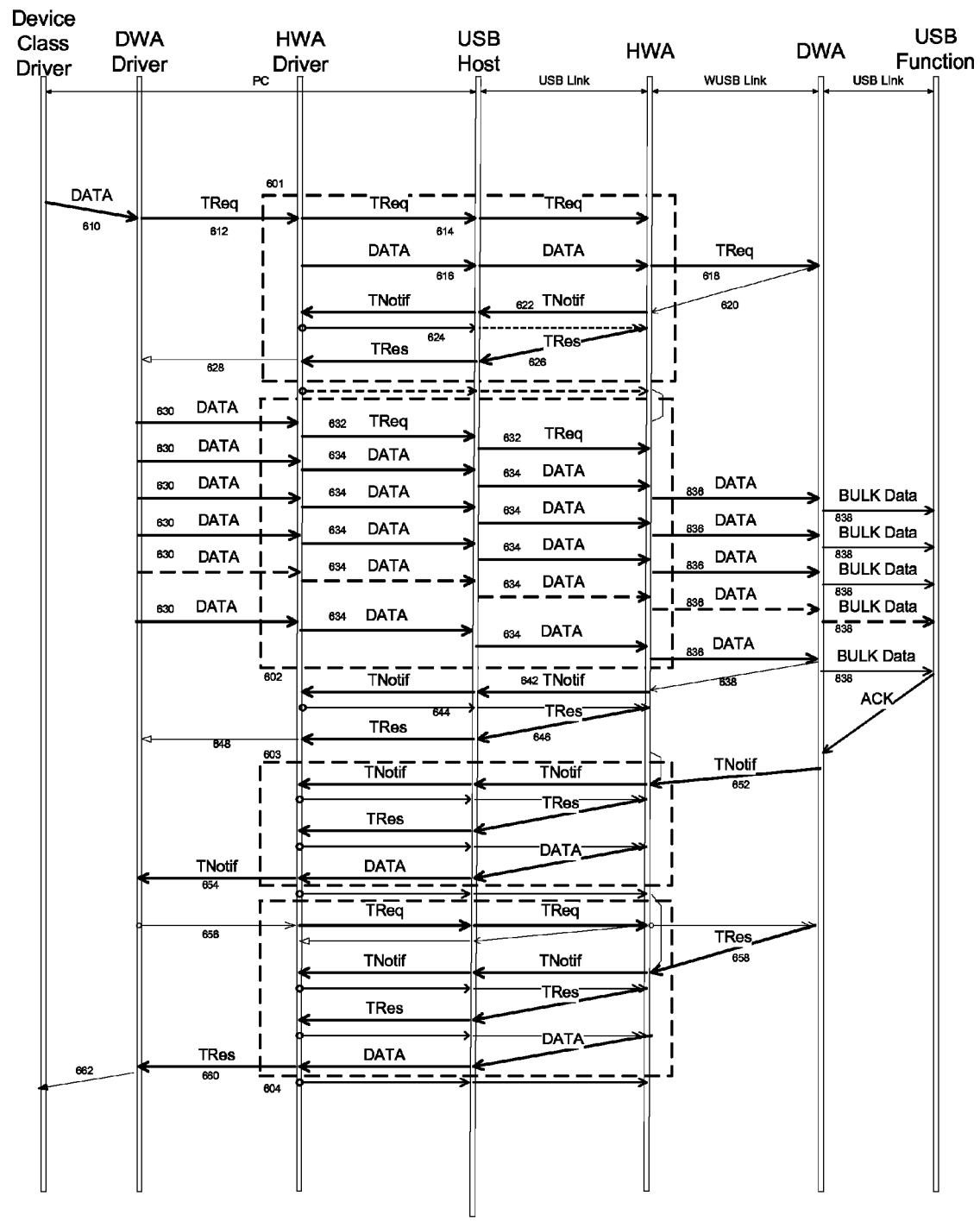

FIG. 3*b* illustrates flow of data, which is conveniently bulk data, in a transmission of data from the host to the USB function, according to an embodiment of the invention. The transmission of data is carried out according to the stages which are detailed in FIG. 3*a*, until the transmission of the transmittable wireless USB transfer from the HWA to the DWA.

According to the illustrated embodiment of the invention, the DWA is adapted to process the transmittable wireless USB transfer to provide a transmittable USB transfer, and to transmit a portion of the transmittable USB transfer before the entire transmittable USB transfer is received by the DWA.

It is noted that according to an embodiment of the invention, the DWA is a device wire adapter according to an embodiment of the invention, which includes a wireless communication component is adapted to receive a received wireless USB transfer (which includes the wireless data packets 836 and which is, it will be clear to a person who is skilled in the art, the transmittable wireless USB transfer of the HWA, in relation to the DWA). The DWA according to this embodiment of the invention further includes a processor which is adapted to process the received wireless USB transfer to provide a transmittable USB transfer (which conveniently includes bulk data packets 838), and a wired communication component which is adapted to transmit a portion of the transmittable USB transfer (i.e. one or more bulk data packets 838) before the entire transmittable USB transfer is received by the DWA (i.e. before the last wireless data packet 836 is received by the DWA).

It is noted that according to an embodiment of the invention, said DWA is adapted to receive the received wireless USB transfer from a system other the HWA which is herein detailed.

According to an embodiment of the invention, after the transmission of the transmittable USB transfer from the DWA to the USB function, the transmission of data in continued according to a standard flow of bulk data in a transmission of data from a host to a USB function, such as the one illustrated in FIG. 1*a*.

Figure 3C:
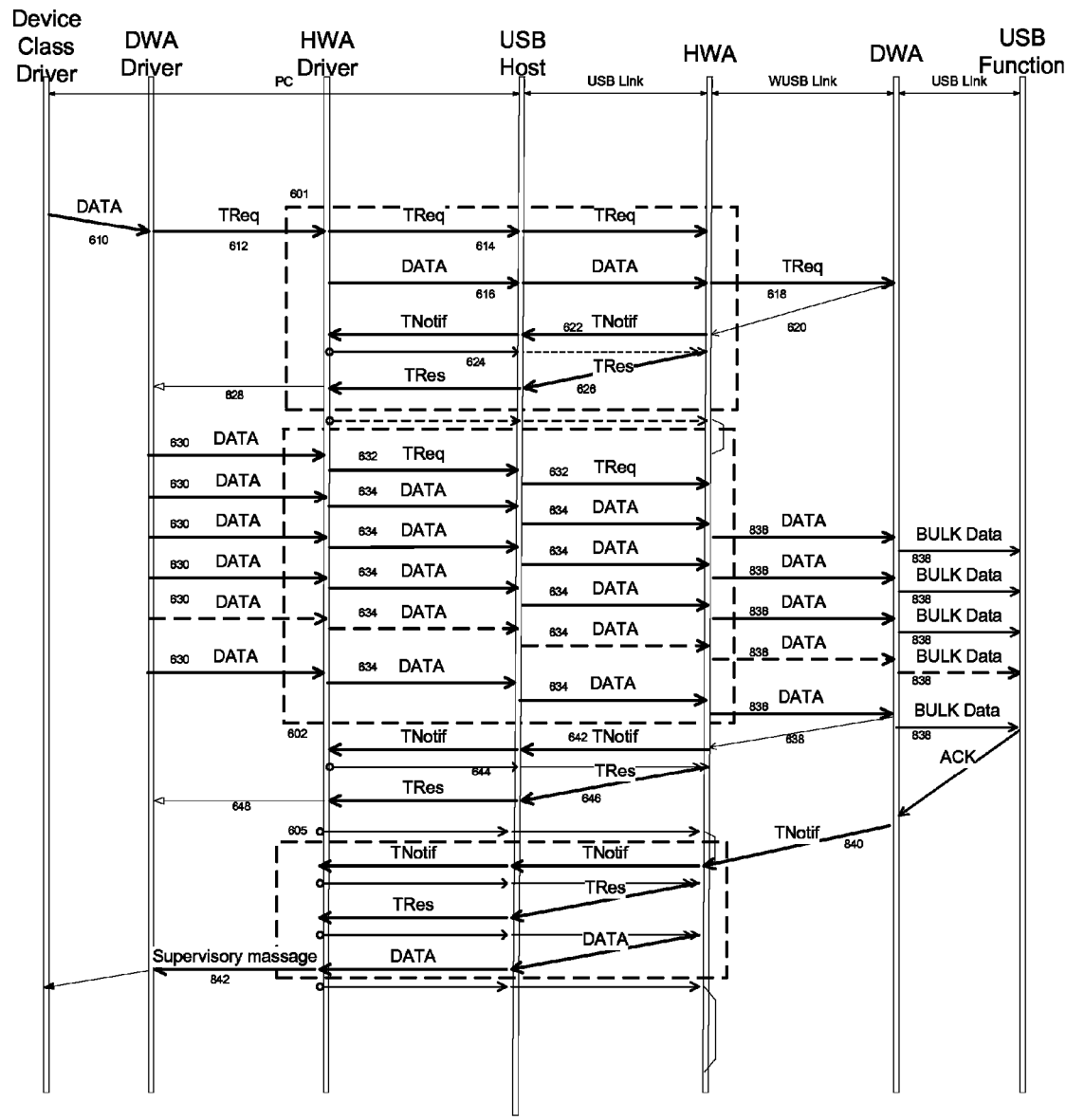

FIG. 3*c* illustrates flow of data, which is conveniently bulk data, in a transmission of data from the host to the USB function, according to an embodiment of the invention. The transmission of data is carried out according to the stages which are detailed in FIG. 3*a*, until the transmission of the transmittable wireless USB transfer from the HWA to the DWA.

According to the embodiment of the invention which is illustrated in FIG. 3*c*, the HWA is adapted to combine the notifications with and the transfer result messages (which are denoted in FIGS. 1*a* as 654 and 660 respectively) by adding transfer result information to the notification message. According to an embodiment of the invention, after the HWA receive notification 840, it is adapted to generate a supervisory message which corresponds to multiple standard control messages, and specifically according to an embodiment of the invention, the HWA is adapted to generate and to transmit supervisory message 842 which corresponds to both notification 654 and to transfer result 660. It is noted that according to an embodiment of the invention, the device class driver is adapted to receive supervisory message 842, or, according to another embodiment of the invention, either the DWA driver or the HWA driver is adapted to generate both a notification and a transfer result in response to supervisory message 842.

It is noted that according to another embodiment of the invention, which is not illustrated, the HWA is adapted to transmit a supervisory message which corresponds to at least one standard control messages by a supervisory messages dedicated endpoint. Specifically, according to an embodiment of the invention, the HWA is adapted to define an endpoint ready message which includes the transfer result information for a specific endpoint which is dedicated for transfer results notification, and so also limiting the time demanded by the notification and transfer result providing.

It is noted that even though FIG. 3*c* illustrates a transmission of data between the DWA and the USB function which is parallel to the one which is illustrated in FIG. 3*b*, said transmission can be carried out also in other manners (such as the manner which is illustrated in FIG. 3*a*), as the following stages which are illustrated in FIG. 3*c* could be carried out in both sorts of embodiments of the invention.

Figure 3D:
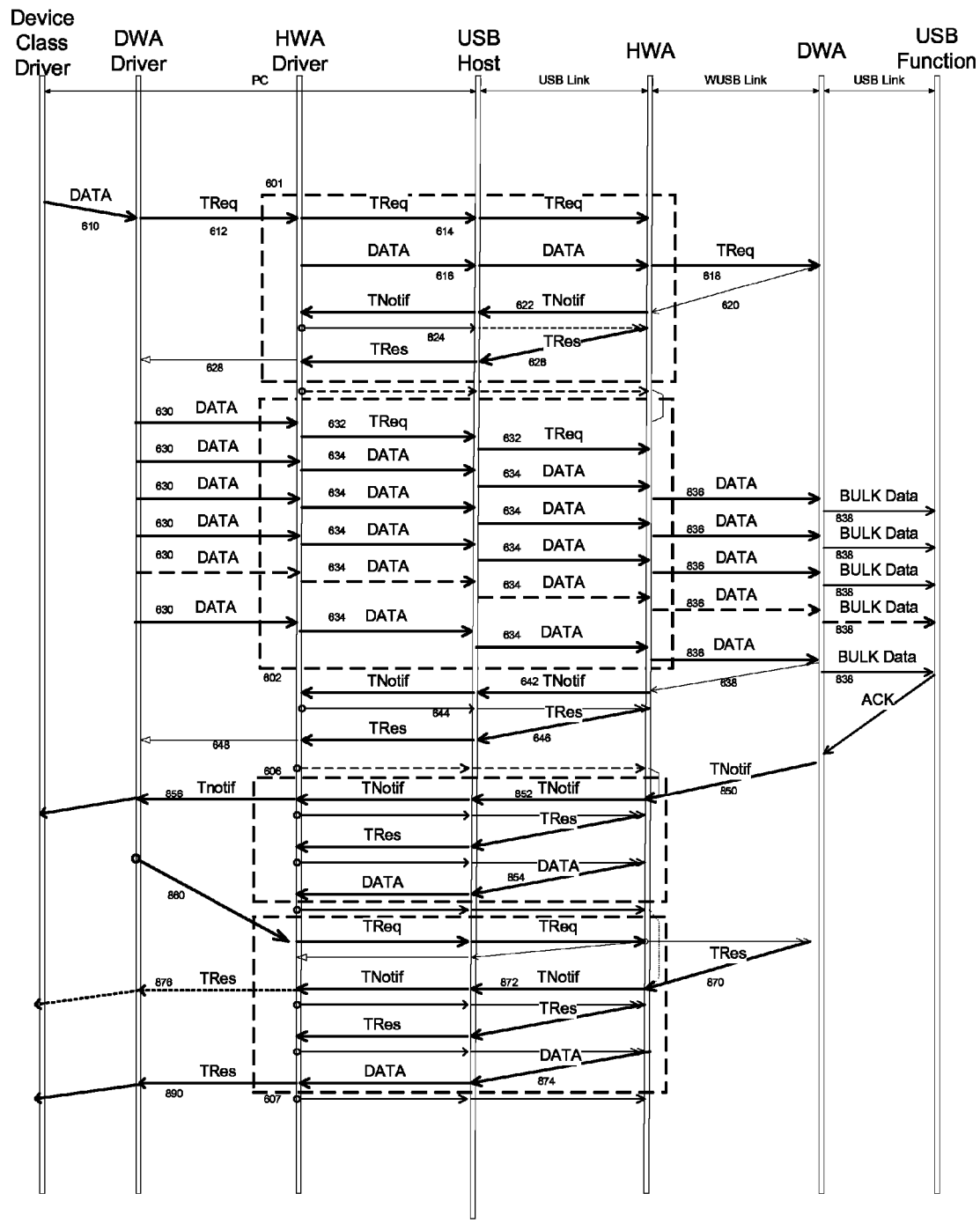

FIG. 3*d* illustrates flow of data, which is conveniently bulk data, in a transmission of data from the host to the USB function, according to an embodiment of the invention. The transmission of data is carried out according to the stages which are detailed in FIG. 3*a*, until the transmission of the transmittable wireless USB transfer from the HWA to the DWA.

According to the embodiment of the invention which is illustrated in FIG. 3*d*, the HWA driver is adapted to transmit a notification to the DWA driver in response to a notification which is addressed to the HWA driver.

According to the illustrated embodiment of the invention, the HWA receives original notification 850 from the DWA. In order to transmit the notification to the DWA driver through the HWA driver, the HWA first issues, as further illustrated and explained in previous figures, first notification 852 which is addressed to the HWA driver, in order to transmit original notification 850 as data 854 of stage 606. According to the illustrated embodiment of the invention, the HWA driver is adapted to generate and to transmit second notification 856 to the DWA driver (which is conveniently similar or identical to original notification 850), without waiting for data 854 to arrive, in response to notification first 852.

It is noted that, according to an embodiment of the invention, the HWA is adapted to generate and to transmit first notification 852 which is addressed to the HWA driver, and which facilitates a generation of second notification 856, which is address to the DWA driver, by the HWA driver.

Conveniently, this facilitates a faster initiation of request for result by the DWA driver, and thus facilitates an earlier initiation of stage 607 of transmitting a result of transfer, which contributes to the over all acceleration of the entire transmission process.

According to an embodiment of the invention, the transmission of result of transfer 890 is carried out during stage 607, which is parallel to a previously discussed transmission of result of transfer. It is noted that, according to another embodiment of the invention, the HWA driver is adapted to transmit a transfer result to the DWA driver in response to a transfer result which is addressed to the HWA driver.

According to such an embodiment of the invention, the HWA receives original transfer result 870 from the DWA. In order to transmit the transfer result to the DWA driver through the HWA driver, the HWA first issues, as further illustrated and explained in previous figures, notification 872 which is addressed to the HWA driver, in order to transmit original transfer result 870 as data 874. According to such an embodiment of the invention, the HWA driver is adapted to generate and to transmit second transfer result 876 to the DWA driver (which is conveniently similar or identical to original transfer result 870), without waiting for data 854 to arrive, in response to notification 872.

It is noted that, according to an embodiment of the invention, the HWA is adapted to generate and to transmit notification 872 which is addressed to the HWA driver, and which facilitates a generation of second transfer result 876, which is address to the DWA driver, by the HWA driver.

It is noted that even though FIG. 3*d* illustrates a transmission of data between the DWA and the USB function which is parallel to the one which is illustrated in FIG. 3*b*, said transmission can be carried out also in other manners (such as the manner which is illustrated in FIG. 3*a*), as the following stages which are illustrated in FIG. 3*d* could be carried out in both sorts of embodiments of the invention.

It is noted that according to some of the embodiments of the invention, the HWA and/or the DWA are adapted to carry out the transmission while not transmitting one or more of the notifications and/or of the results of transfers which are illustrated (and some of which are further detailed), so as to expedite the over all process of transmission.

It is noted that, according to an embodiment of the invention, the HWA and/or the DWA are adapted to transmitting data in one or more stages of the transmission without waiting for a notification, to a result of transfer or to a transfer request, wherein some of those embodiments implement different methods of handling with errors that may arise from those transmissions, as will be clear to a person who is skilled in the art.

It is further noted, that according to different embodiments of the invention, at least one of the HWA driver, USB host, HWA or DWA are adapted to generate and to transmit a transfer request without being requested to by a higher level in the hierarchy, so as to expedite the overall process of transmission, wherein some of those embodiments implement different methods of handling with errors that may arise from those transmissions, as will be clear to a person who is skilled in the art.

It is noted that, According to an embodiment of the invention, the transmission is completed after transmit 856, or following one of the transmits which follow transmit 856.

Figure 4A:
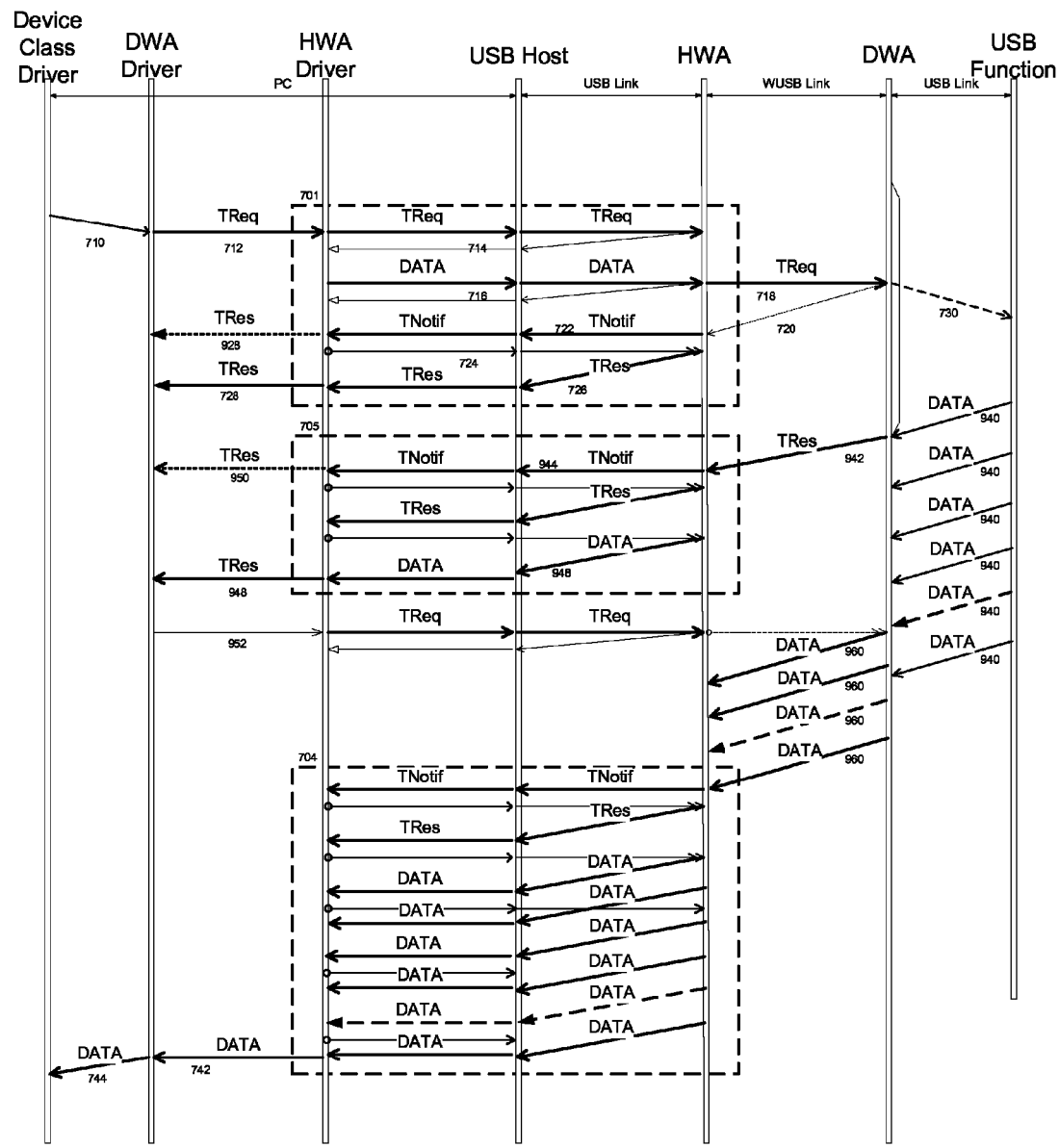
FIGS. 4a and 4b illustrate flow of data in a transmission of data from the USB function to the host, according to an embodiment of the invention.
Figure 4B:
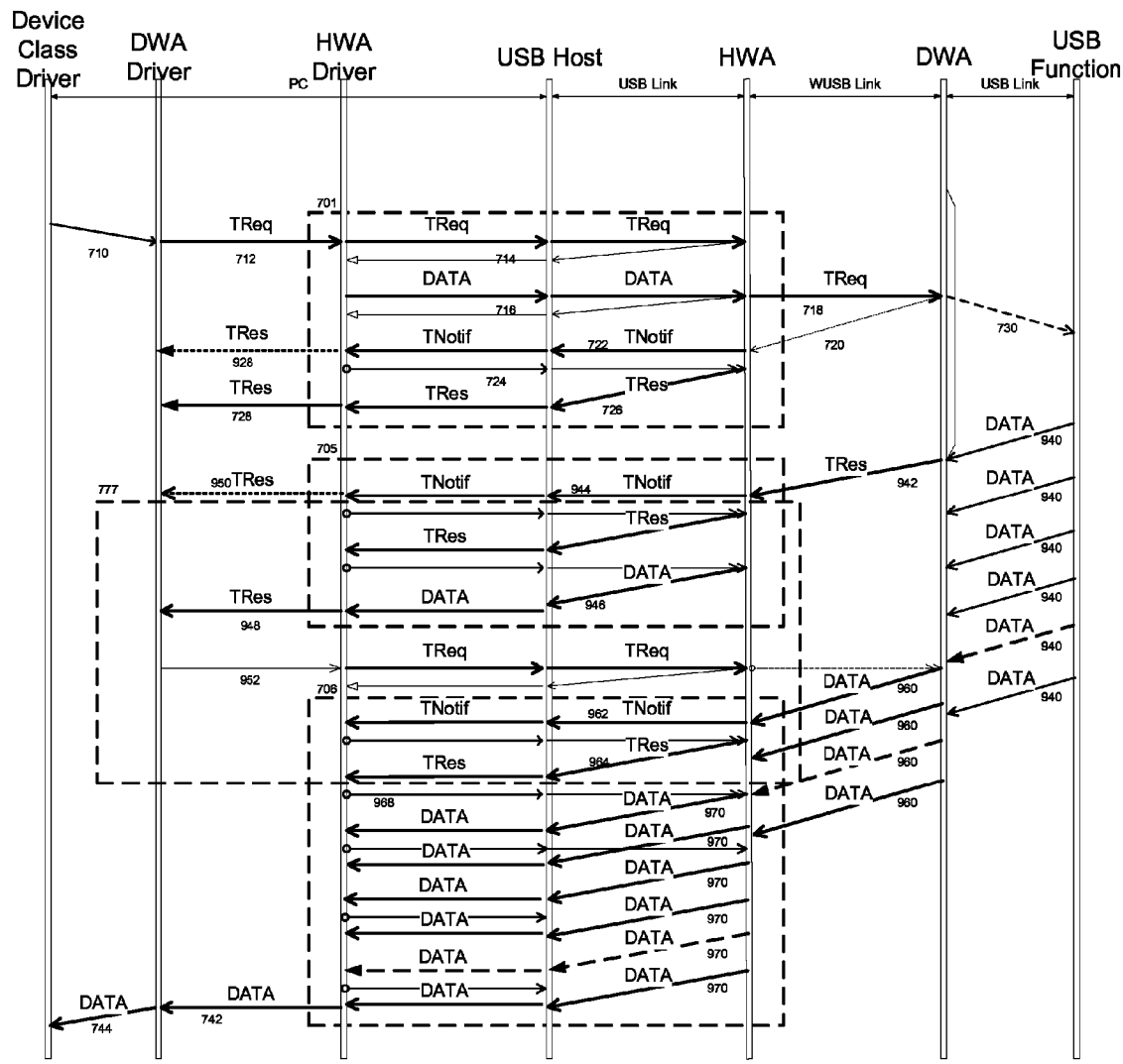

FIGS. 4*a* and 4*b* illustrate flow of data, which is conveniently bulk data, in a transmission of data from the USB function to the host, according to an embodiment of the invention. It is noted that considering one or more of FIGS. 4*a* and 4*b* and the explanations which are offered for said figures in regard to FIG. 1*b* and to the explanation which is offered for FIG. 1*b*. may benefit the clear comprehension of FIGS. 4*a* and 4*b*. It is further noted that similar stages in FIGS. 1*b* and 4*a* and 4*b* are denoted by the same numbers, and thus referring to the explanations pertaining to FIG. 1*b* may further benefit the clear comprehension of FIGS. 4*a* and 4*b*.

FIG. 4*a* illustrates flow of data, which is conveniently bulk data, in a transmission of data from the USB function to the host, according to an embodiment of the invention.

Figure 1B:
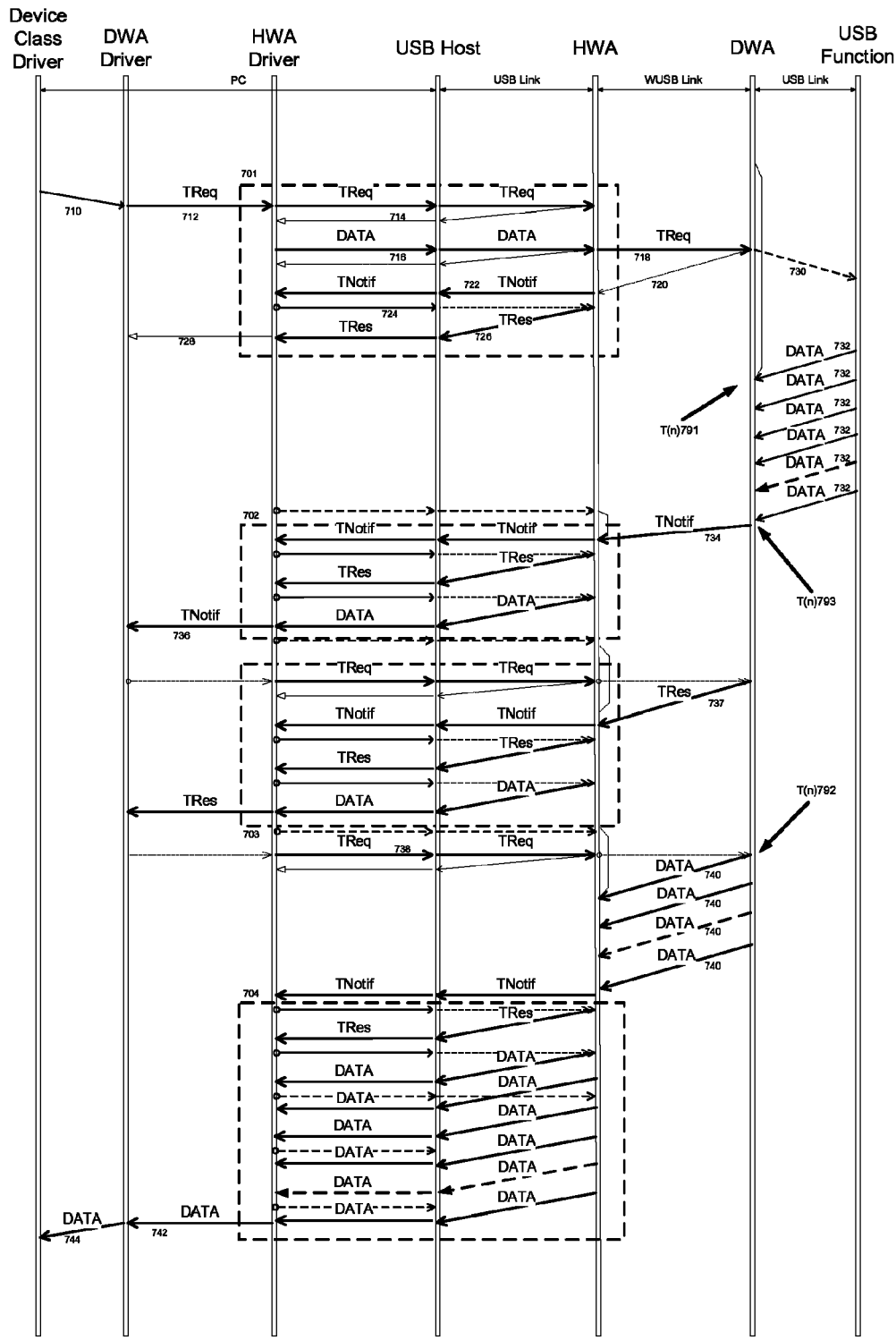
FIG. 1b illustrates a prior art flow of bulk data in a prior art standard transmission of data from the USB function to the host.

Stage 701, and all the transmissions which are denoted as 710 through 730 are, according to an embodiment of the invention, similar to the corresponding stages and transmissions of FIG. 1*b*.

It is noted that while according to an embodiment of the invention, the HWA driver is adapted to transmit result of transfer 728 in response to result of transfer 726 which is received during stage 701, according to another embodiment of the invention, the HWA driver is adapted to generate and to transmit result of transfer 928 in response to notification 722 which is received from the HWA. It is noted that, according to an embodiment of the invention, the HWA is adapted to generate and to transmit notification 722 which is adapted to facilitate the generation of result of transfer 928 by the HWA driver.

After receiving a predetermined number of data packets 940 from the USB function (according to an embodiment of the invention, after receiving the first data packet 940), the DWA transmits result of transfer 942 to the HWA. It is noted that the transmitting of result of transfer 942 before the last data packet 940 is received expedites the entire transmission process, because the transmission of data between the DWA and the HWA, which is as aforementioned a bottleneck of the transmission process, is dependant of request of transmission 952 which can only be issued after result of transmission 948 or 950 is received. It is however noted that, according to an embodiment of the invention, the DWA transmits result of transfer 942 only after the last data packet 940 is received.

It is noted that since not all of data packets 942 were received, the DWA do not posses an exact information regarding the size of the data transfer. A size of transfer is indicated in original request 710, but in some situations and for different reasons the USB function does not always transmit all the data that was requested by the device class driver. However, it will be clear to a person who is skilled in the art that this issue could be solved later on during the transmission, such as after the DWA receives the last data packet 940. According to an embodiment of the invention, the DWA generates and transmits result of transmission 942 which indicates the entire data that was requested will be transmitted.

According to an embodiment of the invention, the HWA transmits result of transfer 948 during stage 705, which is similar to stage 702 which is illustrated in FIG. 1*b*. According to another embodiment of the invention, the HWA driver is adapted to generate and to transmit result of transfer 950 in response to notification 944, without waiting for data 946 which includes result of transfer 942. It is noted that, according to an embodiment of the invention, the HWA is adapted to generate and to transmit notification 942 which is adapted to facilitate the generation of result of transfer 950 by the HWA driver.

After receiving result of transfer 948 or 950, the DWA driver transmits request of transfer 952 to the DWA via the HWA. The DWA than starts to transmit the data transfer in multiple wireless data packets 960 to the HWA, wherein conveniently some of wireless data packets 960 are transmitted to the HWA before the last data packet 940 is received by the DWA.

A processor of the DWA of FIG. 4*a*, which is a device wire adapter according to an embodiment of the invention, is adapted to process a received USB transfer, which is received by way of the multiple data packets 940 by a wired communication component of the DWA, to provide a transmittable wireless USB transfer, which conveniently includes multiple wireless data packets 960. The DWA is adapted to transmit, by a wireless communication component of the DWA, the transmittable wireless USB transfer. Unlike prior art solutions, however, the DWA is adapted to transmit a portion of the transmittable wireless USB transfer (i.e. at least one wireless data packet 960) before the entire received USB transfer (i.e. at least one data packet 940) is received.

It is noted that according to an embodiment of the invention, the DWA is adapted to generate and to transmit a notification and/or result of transfer which indicates a size of the data transfer, after the last data packet 940 is received. According to an embodiment of the invention, the HWA is adapted to generate and to transmit a notification and/or result of transfer which indicates a size of the data transfer, after the last wireless data packet 960 is received.

According to an embodiment of the invention, after the transmission of the transmittable wireless USB transfer from the DWA to the HWA, the transmission of data in continued according to a standard flow of bulk data in a transmission of data from a USB function to a host, such as the one illustrated in FIG. 1*b*.

FIG. 4*b* illustrates flow of data, which is conveniently bulk data, in a transmission of data from the USB function to the host, according to an embodiment of the invention. The transmission of data is carried out according to the stages which are detailed in FIG. 4*b*, until the transmission of the transmittable wireless USB transfer from the HWA to the DWA.

According to the illustrated embodiment of the invention, the HWA is adapted to process the transmittable wireless USB transfer to provide a transmittable USB transfer, and to transmit a portion of the transmittable USB transfer before the entire transmittable USB transfer is received by the HWA.

It is noted that according to an embodiment of the invention, the HWA is a host wire adapter according to an embodiment of the invention, which includes a wireless communication component is adapted to receive a received wireless USB transfer (which includes the wireless data packets 960 and which is, it will be clear to a person who is skilled in the art, the transmittable wireless USB transfer of the DWA, in relation to the HWA). The HWA according to this embodiment of the invention further includes a processor which is adapted to process the received wireless USB transfer to provide a transmittable USB transfer (which conveniently includes data packets 970), and a wired communication component which is adapted to transmit a portion of the transmittable USB transfer (i.e. one or more data packets 970) before the entire transmittable USB transfer is received by the HWA (i.e. before the last wireless data packet 960 is received by the HWA).

It is noted that according to an embodiment of the invention, said HWA is adapted to receive the received wireless USB transfer from a system other the DWA which is herein detailed.

According to the embodiment of the invention which is illustrated in FIG. 4*b*, the HWA is adapted to transmit wireless data packets 970 which include information of the data transfer after a predetermined number (which is equal or larger than one) of wireless data packets 960 are received. It is noted that, conveniently, the HWA does not transmit data packets 970 before receiving request of transfer 968, and therefore, the HWA is adapted, according to said embodiment of the invention, to transmit notification 962 and/or transfer result 964 so as to facilitate an issuing of request of transfer 968.

It is noted that, according to an embodiment of the invention, the HWA is adapted to generate a supervisory message which corresponds to multiple standard control messages, and specifically according to an embodiment of the invention, the HWA is adapted to generate and to transmit a supervisory message which corresponds to both notification 962 and to transfer result 964. It is noted that according to an embodiment of the invention, the device class driver is adapted to receive said supervisory message, or, according to another embodiment of the invention, either the DWA driver or the HWA driver is adapted to generate both a notification and a transfer result in response said supervisory message.

It is noted that according to another embodiment of the invention, which is not illustrated, the HWA is adapted to transmit a supervisory message which corresponds to at least one standard control messages by a supervisory messages dedicated endpoint. Specifically, according to an embodiment of the invention, the HWA is adapted to define an endpoint ready message which includes the transfer result information for a specific endpoint which is dedicated for transfer results notification, and so also limiting the time demanded by the notification and transfer result providing.

According to an embodiment of the invention, after the transmission of the transmittable wireless USB transfer from the HWA to the HWA driver, the transmission of data in continued according to a standard flow of bulk data in a transmission of data from a USB function to a host, such as the one illustrated in FIG. 1*b*.

It is noted that according to some of the embodiments of the invention, the HWA and/or the DWA are adapted to carry out the transmission while not transmitting one or more of the notifications and/or of the results of transfers which are illustrated (and some of which are further detailed), so as to expedite the over all process of transmission.

It is noted that, according to an embodiment of the invention, the HWA and/or the DWA are adapted to transmitting data in one or more stages of the transmission without waiting for a notification, to a result of transfer or to a transfer request, wherein some of those embodiments implement different methods of handling with errors that may arise from those transmissions, as will be clear to a person who is skilled in the art.

It is further noted, that according to different embodiments of the invention, at least one of the HWA driver, USB host, HWA or DWA are adapted to generate and to transmit a transfer request without being requested to by a higher level in the hierarchy, so as to expedite the overall process of transmission, wherein some of those embodiments implement different methods of handling with errors that may arise from those transmissions, as will be clear to a person who is skilled in the art.

It is noted that according to some embodiments of the invention, some or all of the transmits which are collectively denoted as 777 are not carried out.

Referring now back to FIG. 2, according to an embodiment of the invention, universal serial bus (USB) communication system 200 further includes memory unit 260. Conveniently, memory unit 260 is adapted to store at least one of the received USB transfer, the received wireless USB transfer, the transmittable USB transfer and the transmittable wireless USB transfer, or portions thereof, according to some of the different embodiments of the invention.

According to an embodiment of the invention in which memory unit 260 is adapted to store at least a portion of a received transfer (which is either the received USB transfer or the received wireless USB transfer), a size of the received transfer is larger than a size of memory unit 260.

It will be clear to a person who is skilled in the art, that since system 200 is adapted to transmit a portion of a transmittable transfer (which is either the transmittable USB transfer or the transmittable wireless USB transfer) before the entire received transfer is received, there is no need to store a portion of the received transfer after it was processed and transmitted, and that therefore, the size of memory unit 260 can be smaller than that of a received transfer, or—given otherwise, that system 200 may be use to communicate received transfers the size of which is larger than that of memory unit 260.

It should be noted, however, that the size of the received transfer does not have to be larger than the size of memory unit 260, and that conveniently, system 200 is adapted to handle received transfer of different sizes. Moreover, it is clear to a person who is skilled in the art that according to other embodiments of the invention, the size of memory unit 260 is larger than the size of any single received transfer.

It is further clear to a person who is skilled in the art that even if the size of the received transfer is smaller than the size of memory unit 260, implementation of the invention is still beneficial in many ways, such as expediting the wireless communication, in shortening latencies, and in increasing the throughput of the wireless channel.

It is noted that, according to an embodiment of the invention, the system is adapted to receive received transfers via multiple remote pipes, and to transmit the transmittable transfers via multiple remote pipes (wherein the remote pipes which are used to connect to the host and the remote pipes which are used to connect to the USB function may and may not correspond to each other).

It is noted that in prior art solutions, a memory allocation has to be allocated to each of the different remote pipes. Conveniently, the HWA driver inquires about a size of memory unit 260, and determines the size of the memory allocation which is allocated to each of the remote pipes in memory unit 260, wherein, in prior art solutions, the sum of all the memory allocations can not exceed the size of memory unit 260.

According to an embodiment of the invention, however, system 200 is adapted to provide to the HWA driver of the host sizes of memory allocations the sum of which is greater than the size of memory unit 260 (or, according to another embodiment of the invention, to provide to the HWA driver a size of a memory which is greater than the size of memory unit 260 and to receive the memory allocations from the HWA driver). However, as the HWA driver may in such situation transmit to system 200 data transfers according to said sizes of memory allocations, it is essential that system 200 would be adapted to transmit portions of one or more of the transmittable transfers before the entire corresponding received transfers is received.

It will be further appreciated by a person who is skilled in the art, that on some situations at least one transmittable transfer will be postponed, because the party to which the transmittable transfer is addressed is incapable of receiving the transmittable transfer (or a portion of it) in a certain time. This may not pose a problem if sufficient memory is available at memory unit 260. It is noted that different embodiment of the invention implement different ways of dealing with and overloading of memory unit 260 in such situations, such as, though not restricted to, replying to the HWA driver with a max-retry massage.

It is further appreciated by a person who is skilled in the art, that using multiple end point, as is implemented in system 200 according to an embodiment of the invention, reduces the problem of postponed transfers, as other transfer could be transmitted meanwhile using the other end-points and pipes.

It is noted that, according to an embodiment of the invention, system 200 is further adapted to define an endpoint via which transmittable USB transfers of multiple remote pipes are transmitted.

According to an embodiment of the invention, system 200 supports communication via multiple endpoints and via remote pipes, wherein system 200 is further adapted to allocate (and, according to an embodiment of the invention, to reallocate) at least some of the remote pipes to at least some of the multiple endpoints, and so to optimize the performance of system 200 in one or more aspects, such as throughput, latency, quality of service, and so forth.

Figures 6A, 6B:
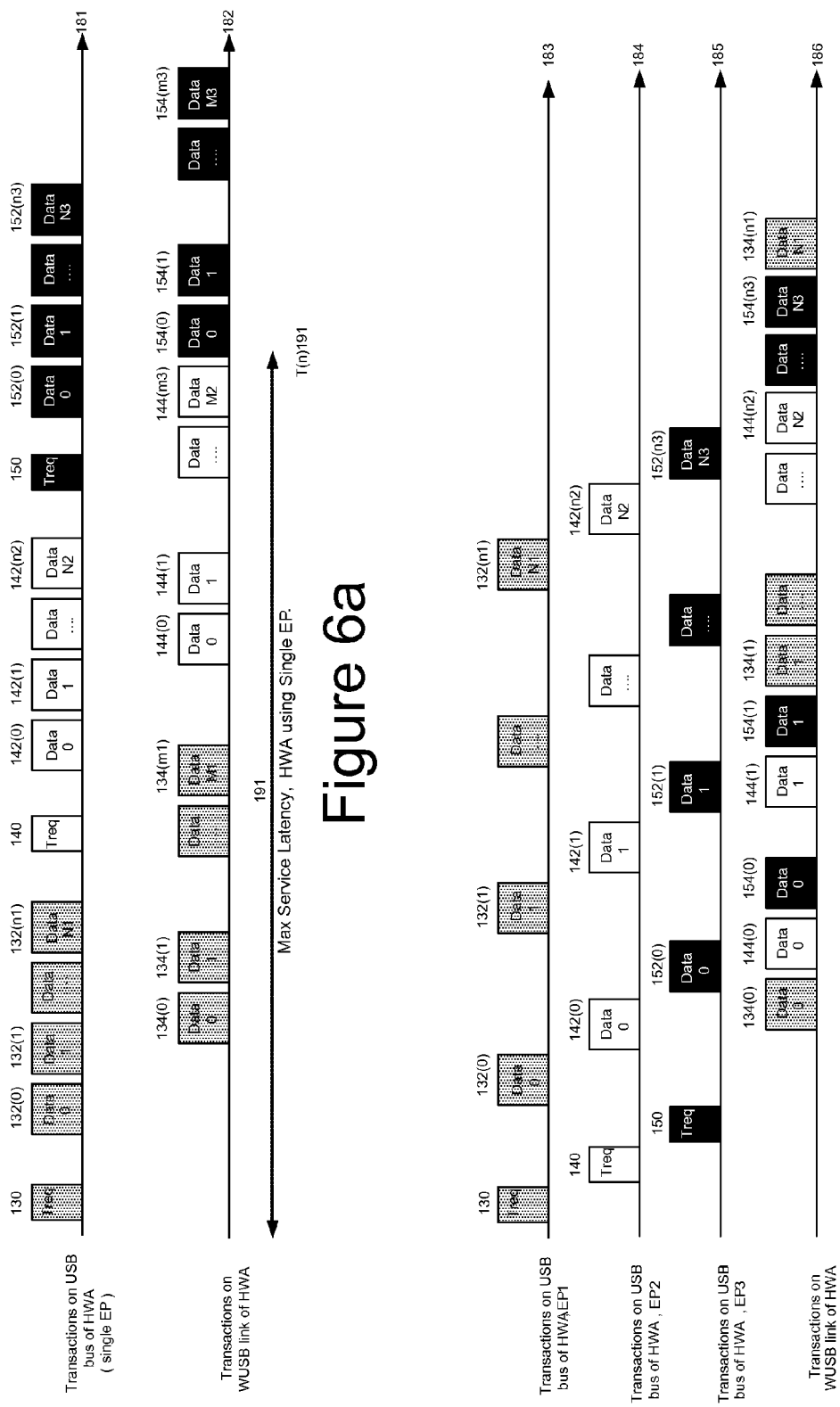
FIG. 6a illustrates the utilizing of a single endpoint by a system, according to an embodiment of the invention.
FIG. 6b illustrates the utilizing of three endpoints by a system, according to an embodiment of the invention.

It is noted that FIGS. 6*a* and 6*b* further illustrates the using of multiple endpoints by system 200.

It is further noted that, according to an embodiment of the invention, system 200 is adapted to receive multiple received USB transfer via multiple endpoints. It will be clear to a person who is skilled in the art that, in situation in which system 200 transmits data to and/or from multiple USB functions and/or via multiple remote pipes, than multiple received USB transfers are received by system 200 which are intended for the different USB functions and/or to the different remote pipes. Therefore, problem in the transmission of one of the received USB transfers could delay the receiving of at least one other received USB transfer. The utilizing of multiple endpoint for the receiving of the received USB transfers, however, limits or prevents this problem.

It is noted that, according to an embodiment of the invention, system 200 is further adapted to process the received USB transfer to provide multiple transmittable wireless USB segments, wherein each of the multiple transmittable wireless USB segments includes at least a portion of the data of the received USB transfer. It is clear to a person who is skilled in the art that in some situations it is desirable to transmit multiple shorter transmittable wireless USB transfers instead of a single long one. It is noted that according to an embodiment of the invention, the multiple transmittable wireless USB segments include portions of the received USB transfer which exclude each other.

It is noted that transmitting multiple shorter transmittable wireless USB transfers instead of a single long one may utilize the memory unit more efficiently, and that it improves streaming and handling of multiple received transfers.

It is noted that, according to an embodiment of the invention, system 200 is further adapted to transmit at least a portion of the transmittable wireless USB transfer without receiving a request for transfer.

It is noted that when data is transmitted from the USB function to the wireless USB host, channel time allocations are conveniently allocated by the wireless USB host to the different transmittable wireless USB transfer, which are send via different end points, and according to some embodiments by different USB functions. It is noted that according to the wireless USB standard (WUSB), the channel time allocation is WUSB device receive channel time allocation (WdrCTA) or WUSB device transmit channel time allocation (WdtCTA).

A known problem in the art is, however, that sufficient data is not always available to the host regarding the size of the data which is available for transmission, and therefore in some situations superfluous channel time allocation are allocated, which are not fully utilizing the entire channel time allocation, and therefore the throughput of the wireless channel suffers.

Some prior art solutions for this problem, which are known to a person who is skilled in the art, use different parameters such as max-burst size and max-packet size (which according to some solutions may be adjusted) and the like for the determination of the channel time allocations. It is known to a person who is skilled in the art that such channel time allocation always leaves inefficiencies such as under-utilization of the WdtCTA time in case the device has less data to transmit, or, even flow-control events, in case the device has no data to transmit.

Therefore, according to an embodiment of the invention, system 200 is adapted to transmit to the wireless USB host one or more values of available transmittable data, which pertains to available transmittable data in one or more end points. It is noted that conveniently, the wireless USB host to which the one or more values of the available transmittable data are transmitted is adapted to allocate the channel time allocations in response to the one or more values of the available transmittable data. It is further noted that, according to an embodiment of the invention, system 200 is further adapted to generate at least one of the one or more values of available transmittable data.

It is noted that, according to different embodiments of the invention, the one or more values of the available transmittable data are transmitted to the wireless USB host in different manners such as, though not limited to, device notifications using device notification time slots (DNTS), an addition to a header of a data transmission which is sent via a specific endpoint, and so forth.

Figure 5A:
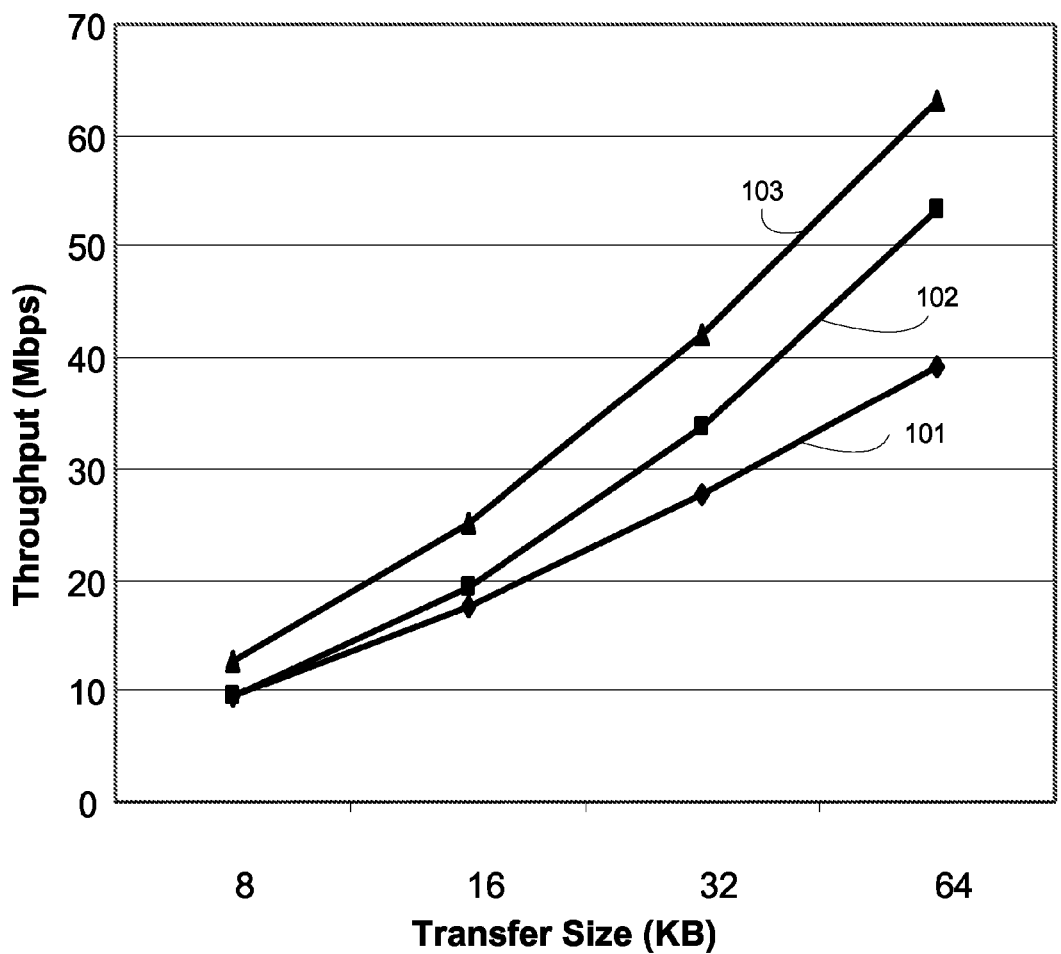
FIGS. 5a, 5b and 5c are graphs of throughputs of a wireless channel.
Figure 5B:
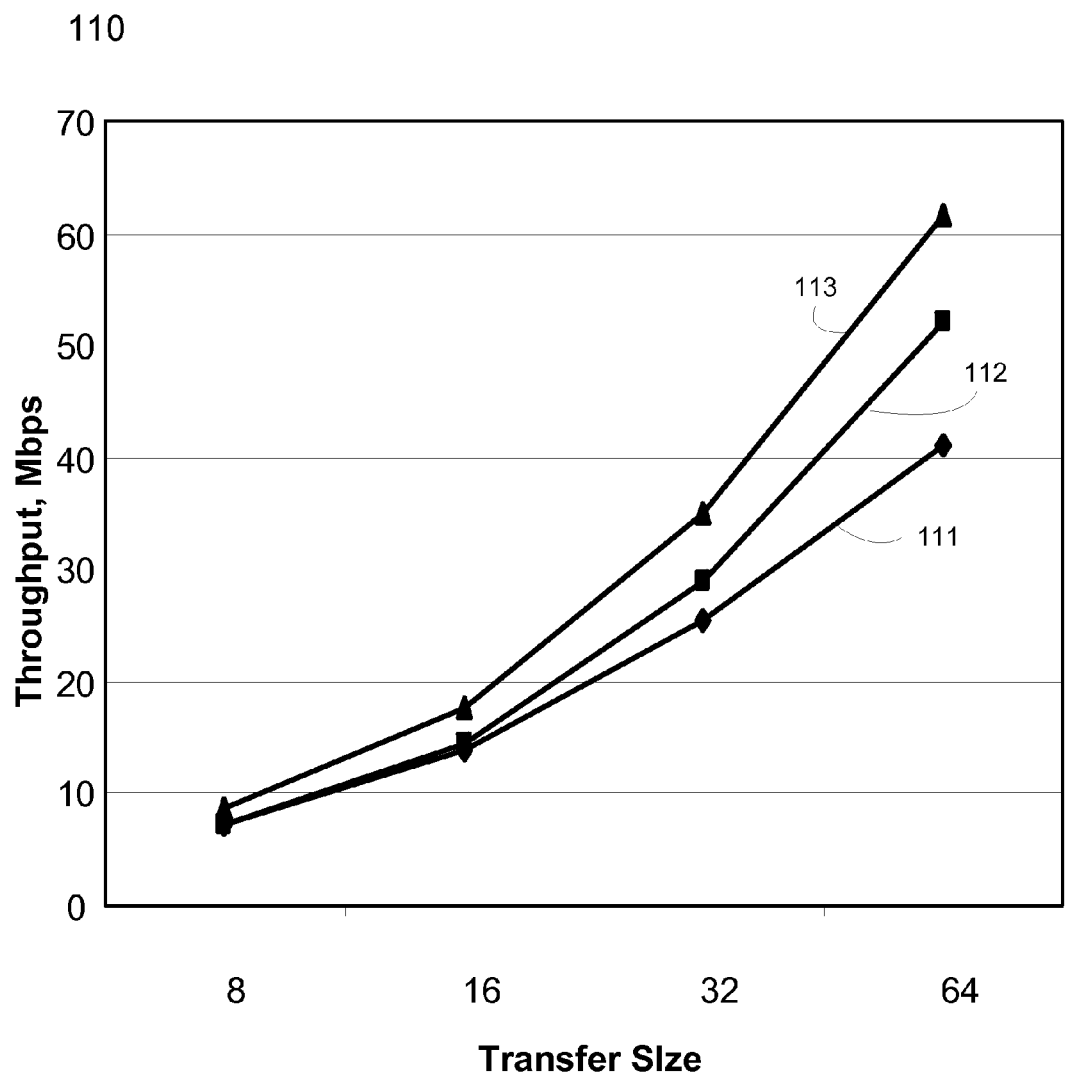
Figure 5C:
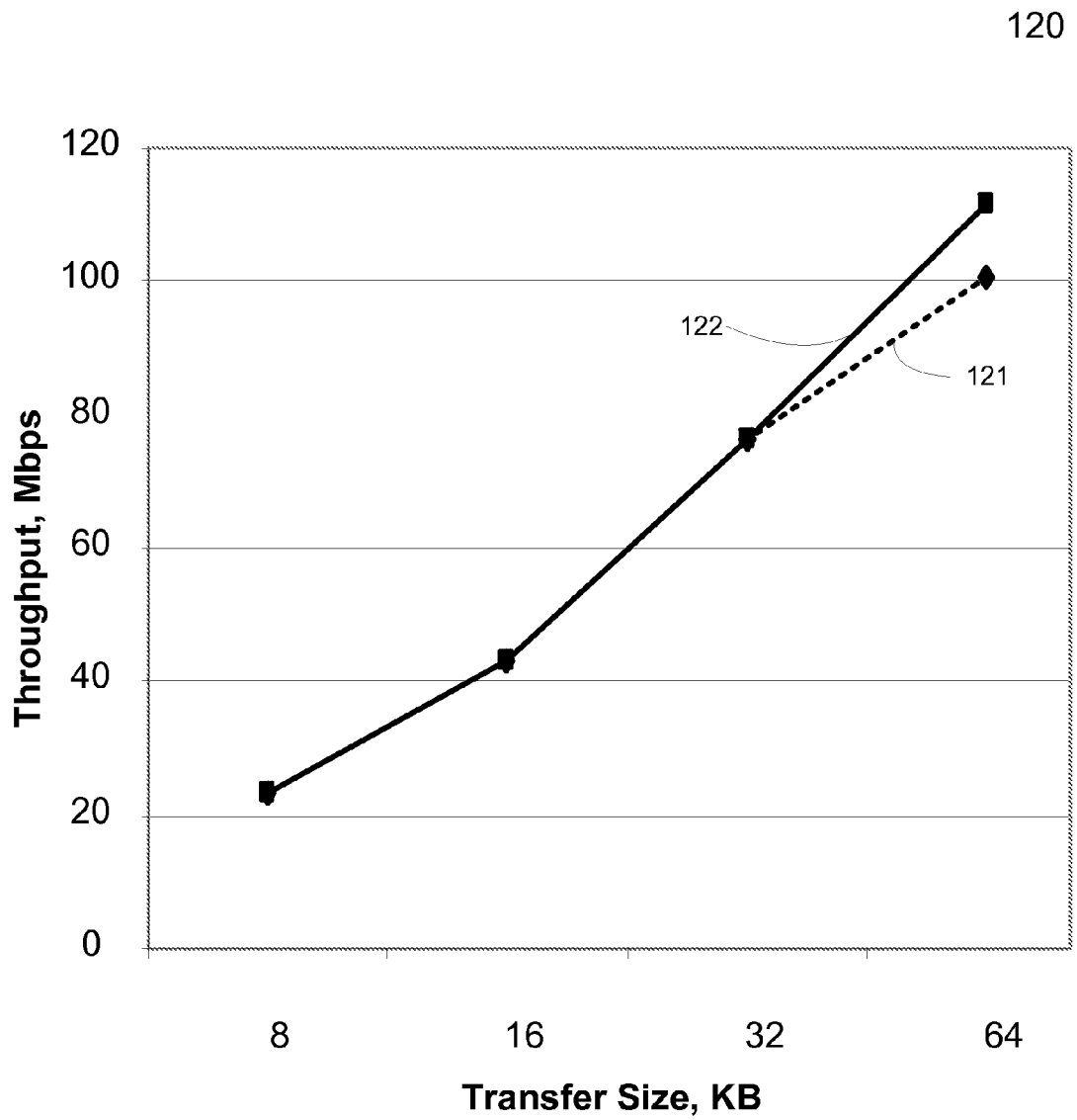

FIGS. 5a through 5c are graphs of throughputs of a wireless channel. FIG. 5a is a graph of a throughput of a wireless channel. Graph 100 demonstrates a throughput of the wireless channel using different intermediate system for different sizes of data transfers, for a bulk transmission from the host to the USB function. Line 101 represents the throughput of the wireless channel using a prior art solution; line 102 represents the throughput of the wireless channel which is connecting wireless systems according to an embodiment of the invention which are adapted to transmit a portion of the transmittable wireless USB transfer before the entire received USB transfer is received; and line 103 represents the throughput of the wireless channel which is connecting wireless systems according to an embodiment of the invention which are adapted to transmit a portion of the transmittable wireless USB transfer before the entire received USB transfer is received and wherein at least one of the wireless system which are an embodiment of the invention is further adapted to generate and to transmit a supervisory message which corresponds to multiple standard control messages.

It could be seen from graph 100, that systems 200 are more effective in utilization of the wireless channel than prior art systems, and furthermore, that the improvement is getting more significant as the size of the data transfer is larger.

FIG. 5b is a graph of a throughput of a wireless channel. Graph 110 demonstrates a throughput of the wireless channel using different intermediate system for different sizes of data transfers, for a bulk transmission from the USB function to the host. Line 111 represents the throughput of the wireless channel using a prior art solution; line 112 represents the throughput of the wireless channel which is connecting wireless systems according to an embodiment of the invention which are adapted to transmit a portion of the transmittable wireless USB transfer before the entire received USB transfer is received; and line 113 represents the throughput of the wireless channel which is connecting wireless systems according to an embodiment of the invention which are adapted to transmit a portion of the transmittable wireless USB transfer before the entire received USB transfer is received and wherein at least one of the wireless system which are an embodiment of the invention is further adapted to generate and to transmit a supervisory message which corresponds to multiple standard control messages.

It could be seen from graph 110, that systems 200 are more effective in utilization of the wireless channel than prior art systems, and furthermore, that the improvement is getting more significant as the size of the data transfer is larger.

FIG. 5c is a graph of a throughput of a wireless channel. Graph 120 demonstrates a throughput of the wireless channel using different intermediate system for different sizes of data transfers, for a bulk transmission from the host to the USB function. Line 121 represents the throughput of the wireless channel using a prior art solution; line 122 represents the throughput of the wireless channel which is connecting wireless systems; wherein a first wireless system is a host wire adapter which is connected to the host is a host wire adapter according to an embodiment of the invention, and the second wireless system is a prior art DWA.

It could be seen from graph 120, that system 200 is more effective in utilization of the wireless channel than prior art systems, especially as the size of the data transfer increases.

It is noted that the numerical values that were offered in FIGS. 5*a* through 5*c* were offered by way of example only. It is further noted that different embodiment of the invention facilitate different throughput of a wireless channel, and that different embodiments of the invention can support various sizes of data transfers, and not only those used as examples in the offered graphs of FIGS. 5*a* through 5*c*.

According to an embodiment of the invention, system 200 is adapted to use multiple end points, each of which serves one or more remote pipes. Furthermore, according to an embodiment of the invention, the memory allocations are assigned to each of the end points, wherein, according to an embodiment of the invention, system 200 is adapted to modify a memory allocation which is associated with one of the end points.

According to an embodiment of the invention, system 200 is adapted to modify one or more memory allocations according to the transmission or to the reception of transfer requests, of data transfers, or combination thereof. Conveniently, this is done in order to improve a utilization of memory unit 260, as is clear to a person who is skilled in the art.

It is noted that, according to an embodiment of the invention, system is adapted to serve a first remote pipe by a first end point at a first time, and later to serve the first remote pipe by a second end point in a second time, wherein the second time is later than the first time. This is conveniently done by reassigning the first remote pipe to the second end point.

FIGS. 6*a* and 6*b* illustrates the utilizing of different amount of end points by different embodiments of system 200, according to different embodiments of the invention. Both of FIGS. 6*a* and 6*b* illustrate a transmitting of three data transfers by system 200, wherein data which belongs to each of the transfer is indicated in FIGS. 6*a* and 6*b* by a different filling pattern (full, partially full, and empty). It is noted that FIGS. 6*a* and 6*b* further refer to the explanations that was offered regarding previous figures, and especially FIGS. 3*a* through 3*d*.

FIG. 6*a* illustrates the utilizing of a single endpoint by system 200 which is a HWA in order to transmit all three transfers, according to an embodiment of the invention. It is noted that data transmissions which are illustrated on timeline 181 refer to three received USB transfers and that data transmissions which are illustrated on timeline 182 refer to the three corresponding transmittable wireless USB transfers.

A first data transfer (which is indicated by partially full blocks) begins with the receiving of transmission request 130, which is followed by data packets 132(0) through 132(*n*1) of a first received USB transfer. Since system 200 of FIG. 6*a* only utilize a single endpoint, a second data transfer (which is indicated by empty blocks) can not be received until the first data transfer was fully received. It will be clear to a person who is skilled in the art that any postponement in the receiving of the first data transfer will therefore postpone the second data transfer, a third data transfer (and additional data transfers if any). However, as is demonstrated by FIGS. 6*a* and 6*b*, a postponement will occur even if the first data transfer is transmitted uninterruptedly, due to the utilizing of a single endpoint.

The second data transfer begins with the receiving of transmission request 140, which is followed by data packets 142(0) through 142(*n*2) of a second received USB transfer, and the third data transfer (which is indicated by filled blocks) begins with the receiving of transmission request 150, which is followed by data packets 152(0) through 152(*n*3) of a third received USB transfer.

It is noted that it is assumed that the three data transfer are needed to be transmitted nearly at the same time, but the second and the third data transfers are postponed, so as to allow a completion of the receiving of previous data transfers.

According to the teaching of the invention, a transmission of a first transmittable wireless USB transfer is starting before the receiving of the entire first received USB transfer, with the transmission of first wireless data packet 134(0).

Only after the entire first transmittable wireless USB transfer was transmitted, a transmission of the second transmittable wireless USB transfer starts, to be followed with a transmission of the third transmittable wireless USB transfer after its completion. Therefore, the transmission of the third transmittable wireless USB transfer, which starts with the transmitting of wireless data packet 154(0), only starts at moment T(n)191, and therefore the latency time of the third transfer (which is illustrated by arrow 191) is relatively long.

It is noted that conveniently, the first, second and third data transfers 132, 142 and 152 are wired data transfers, and that the sequentiality of data transfers of different endpoints is conveniently only required in wired USB communication, and not in the wireless transfers 134, 144, and 164.

FIG. 6*b* illustrates the utilizing of three endpoints by system 200 to transmit all three transfers, according to an embodiment of the invention. Data transmissions which are illustrated on timelines 183 through 185 are the first, second and third received USB transfers, respectively, which are transmitted over three different endpoints which system 200 utilize.

It is noted that since there is still one wired and one wireless channel, both the data packets 132, 142 and 152 of the received USB transfers and the wireless data packets 134, 144 and 154 of the transmittable wireless USB transfers need to be transmitted serially. The serial transmission is also applicable for transfer requests 130, 140 and 150, and therefore second transfer request 140 is transmitted over the second endpoint only after first transfer request 130 was transmitted over the first endpoint, followed by a transmission of third transfer request 150 over the third endpoint.

After which, the multiple data packets 132, 142 and 152 are transmitted over the different endpoints, wherein it is noted that the order of transmission may differ from the one which is illustrated in FIG. 6*b*.

The first wireless data packet 134(0) could be transmitted after reception, and to be followed by data packets 144(0) and 154(0) of the second and the third transmittable wireless USB transfers respectively.

Therefore, the transmission of the third transmittable wireless USB transfer, which starts with the transmitting of wireless data packet 154(0), starts at moment T(n)192, and therefore the latency time of the third transfer (which is illustrated by arrow 192) is shorter than latency time T(n)191 of system 200 which utilizes a single endpoint.

It will be clear to a person who is skilled in the art, that a similar explanation demonstrates the benefits of utilizing multiple endpoints for a system 200 which is a DWA.

It is again noted that the latency which results from the applying of a single endpoint results from the sequentiality required in the wired transmission, and conveniently is not required in the wireless transmission.

Figure 7A:
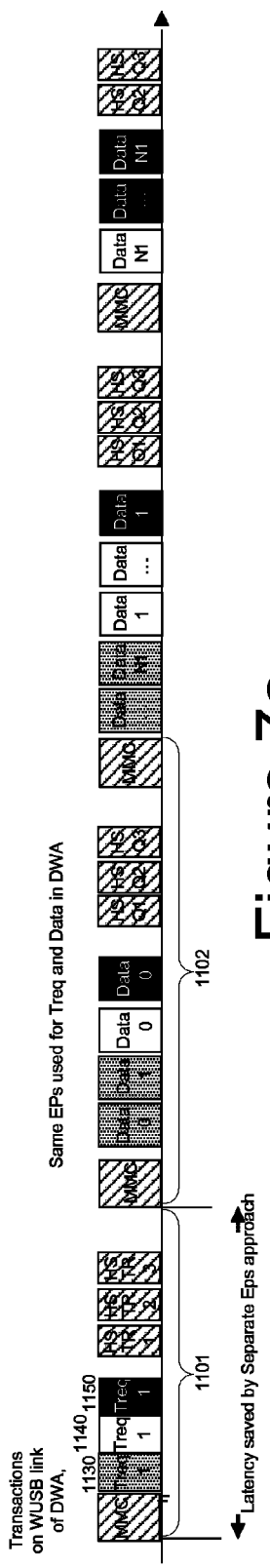
FIGS. 7a and 7b illustrate transmission of data over a wireless channel by a system which is a DWA, according to two embodiments of the invention.
Figure 7B:
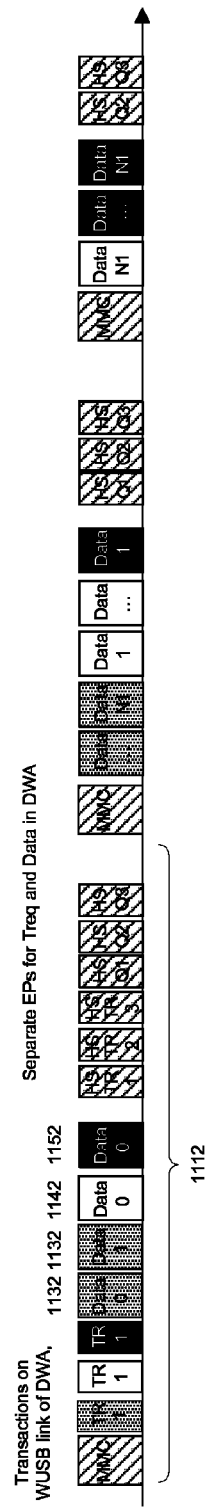

FIGS. 7*a* and 7*b* illustrate transmission of data over a wireless channel by a system 200 which is a DWA, according to two embodiments of the invention, wherein the embodiment which is illustrated in FIG. 7*a* transmit transfer requests (denoted as TR) via the endpoints which are used for the transmission of transfers, wherein the embodiment of the invention which is illustrated in FIG. 7b utilizes separate endpoints for the transmission of transfer requests.

In FIG. 7a, transfer requests 1130, 1140 and 1150 for the three transfers are included in the first transaction group 1101, as well as additional handshakes regarding transfer requests 1130, 1140 and 1150. Since in each transaction group, only one device transmission of every endpoint could be transmitted, the data of the transfers could only be transmitted in second transaction group 1102.

According to an embodiment of the invention, system 200 is adapted to use at least one third endpoint for transfer requests.

It is conspicuous to a person who is skilled in the art the in this way latency overhead which results from processing of transfer requests and from processing and sending data transfers in separate transaction groups is minimized. In the embodiment of the invention which is illustrated in FIG. 7b, a separate endpoint is used for transfer requests, and therefore transfer requests 1130, 1140 and 1150 which are transmitted (and according to an embodiment of the invention as a unified transfer request 1160) in the first transaction group 1112 which also includes wireless data packets 1132, 1142 and 1152, and therefore the latency time is reduced.

Figure 7C:
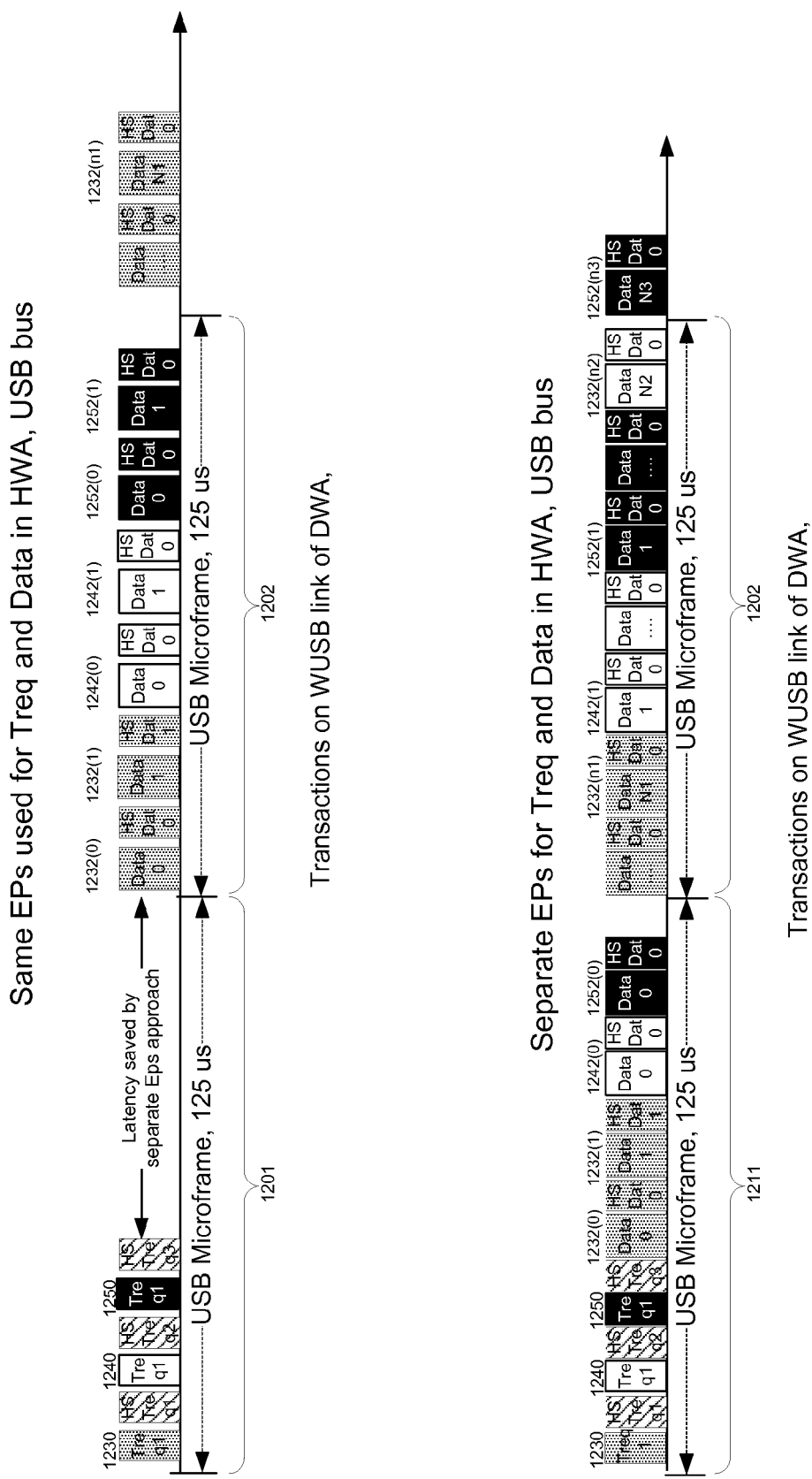
FIG. 7c illustrates transmissions of data over a wired channel by a system which is a HWA, according to two embodiments of the invention.

FIG. 7c illustrates transmission of data over a wired channel by a system 200 which is a HWA, according to two embodiments of the invention, wherein the top line relates an embodiment which transmits transfer requests (denoted as TR) via the endpoints which are used for the transmission of transfers, and wherein the bottom line relates to an embodiment of the invention which utilizes separate endpoints for the transmission of transfer requests.

Not unlike the proceeding in the wireless channel, also in the wired channel which is illustrated in FIG. 7c, transmitting transmission requests 1230, 1240 and 1250 via the same endpoint which are used for the transmission of the data transfers implies that transfer requests 1230, 1240 and 1250 have to be transmitted in separate USB microframe 1201, and therefore that the transmitting of data packets 1232, 1242 and 1252 of the data transfer could only commence in second USB multiframe 1202. Since transfer request 1230, 1240 and 1250 are relatively short, the latency time which is resulted could be a significant delay.

However, utilizing a different endpoint for the transmission of transfer requests 1230, 1240 and 1250, which is illustrated over the bottom line, means the data packets 1232, 1242 and 1252 of the three data transfers could be transmitted in first USB microframe 1211 which also includes data packets 1232, 1242 and 1252, and therefore the latency time according to the herein offered embodiment of the invention is reduced.

Figure 8:
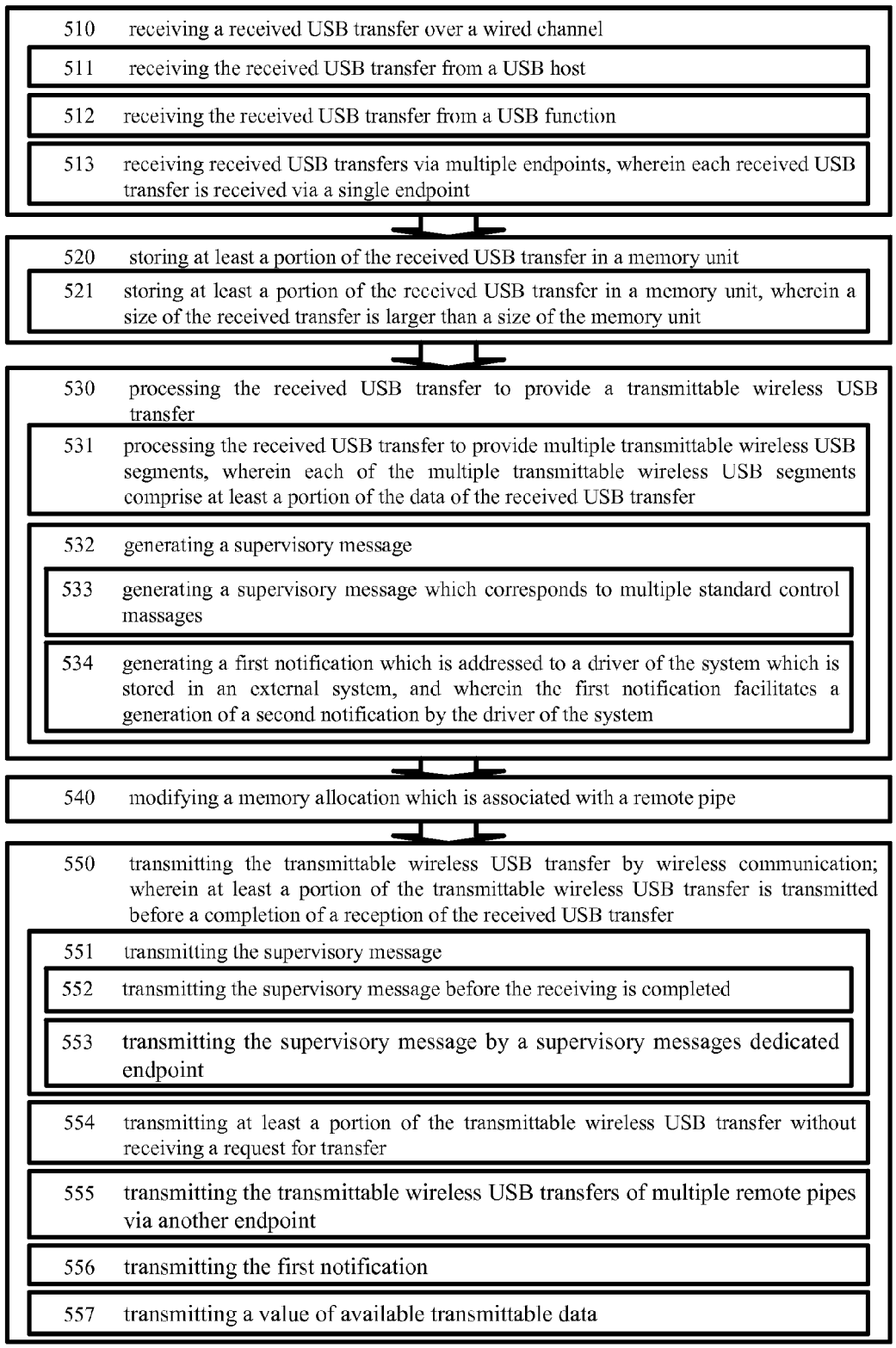
FIG. 8 illustrates a method for wirelessly transmitting USB communication, according to an embodiment of the invention.

FIG. 8 illustrates method 500 for wirelessly transmitting USB communication, according to an embodiment of the invention. It is noted that at least some embodiments of method 500 are adapted to be carried out by systems according to different embodiments of the invention, such as the system which is previously referred to as system 200 in regard to previous drawing. It is further noted that different embodiments of method 500 are adapted to be utilized by the different embodiments of system 200, and that the details and the examples which were offered in regard to systems according to different embodiments of the invention may be considered as applying for method 500, where applicable.

It is therefore recommended to a person who is skilled in the art to refer to the previous drawing which illustrate different aspects of the embodiments when reviewing method 500.

It is further noted that according to some of the embodiments of the invention, method 500 includes receiving, processing and transmitting of multiple data transfers, wither serially or in at least partially parallel manner.

As will be elucidated and detailed further ahead, some important embodiments of the method pertains to host wire adaptors (HWAs) and/or to device wire adaptors (DWAs). Since it is often desirable to provide wireless USB communication for USB devices and for USB host which are not native USB devices or hosts, it is possible to connect a DWA to a USB device and/or to connect a HWA to a USB host, and so to provide the USB device and/or to the USB host wireless USB communication capabilities.

Method 500 starts with stage 510 of receiving a received USB transfer over a wired channel. Referring to the examples set forward in the previous drawings, stage 510 is conveniently carried out by wired communication component 230. Conveniently, the receiving is carried out according to standard USB protocols. It is noted that conveniently, the received USB transfer is a received bulk transfer.

According to an embodiment of the invention, stage 510 includes stage 511 of receiving the received USB transfer from a USB host. Conveniently, stage 511 is carried out by a system which is a host wire adapter, which is adapted to wireless connect the USB host to a USB function.

According to an embodiment of the invention, stage 510 includes stage 512 of receiving the received USB transfer from a USB function. Conveniently, stage 512 is carried out by a system which is a device wire adapter, which is adapted to wireless connect the USB function to a USB host.

According to an embodiment of the invention, stage 510 includes stage 513 of receiving the received USB transfers via multiple endpoints, wherein each received USB transfer is received via a single endpoint.

The receiving of the received USB transfer via multiple endpoint is advantageous in many aspects, as clear to a person who is skilled in the art, and some of which are discussed previously. Notably, the receiving of the received USB transfer via multiple endpoint at least partially answer problems that may arise from a problematic receiving of the received USB transfer in situations in which stage 510 includes receiving of multiple received USB transfer simultaneously. Some of the benefits of utilizing multiple endpoints are discussed in regarding to previous drawings.

According to an embodiment of the invention, stage 510 is followed by stage 520 of storing at least a portion of the received USB transfer in a memory unit. Referring to the examples set forth in the previous drawings, the storing is conveniently carried out by memory unit 260.

According to an embodiment of the invention, stage 520 includes stage 521 of storing the at least a portion of the received USB transfer in a memory unit, wherein a size of the received USB transfer is larger than a size of the memory unit. It is noted that some of the following stages of method 500 include processing the received USB transfer and transmitting data in response to the outcome of the processing, and therefore it is, according to an embodiment of the invention, no longer necessary to store portions of the received USB transfer which were already processed. It is noted that according to an embodiment of the invention, method 500 includes handling multiple data transfers, wherein conveniently memory allocations of the memory unit are allocated. According to an embodiment of the invention, stage 521 includes storing the at least a portion of the received USB transfer in a memory unit according to a memory allocation, wherein a size of the received USB transfer is larger than the memory allocation according to which the received USB transfer is stored.

It should be noted, however, that the size of the received transfer does not have to be larger than the size of the memory unit, and that conveniently, method 500 facilitates handling of received transfers of different sizes. Moreover, it is clear to a person who is skilled in the art that according to other embodiments of the invention, the size of the memory unit is larger than the size of any single received transfer.

It is further clear to a person who is skilled in the art that even if the size of the received transfer is smaller than the size of the memory unit, implementation of the method is still beneficial in many ways, such as expediting the wireless communication, in shortening latencies, and in increasing the throughput of the wireless channel.

Method 500 continues with stage 530 of processing the received USB transfer to provide a transmittable wireless USB transfer. Conveniently, the processing includes processing the received USB transfer which corresponds to a standard USB protocol to provide the transmittable wireless USB transfer, which corresponds to a standard wireless USB standard. It is noted that conveniently, stage 530 includes retrieving the payload of the received USB transfer, and generating new wireless data packets which are transmittable over the wireless channel, and which together form the transmittable wireless USB transfer. Referring to the examples set forth in the previous drawings, the processing is conveniently carried out by processor 220.

It is further noted that according to an embodiment of the invention, stage 530 includes processing the received USB transfer which is a received bulk transfer, conveniently to provide transmittable wireless bulk transfer.

Conveniently, method 500 further includes storing at least a portion of the transmittable wireless USB transfer in the memory unit, wherein, Referring to the examples set forth in the previous drawings, the storing is conveniently carried out by memory unit 260.

According to an embodiment of the invention, stage 530 includes stage 531 of processing the received USB transfer to provide multiple transmittable wireless USB segments, wherein each of the multiple transmittable wireless USB segments includes at least a portion of the data of the received USB transfer. It is clear to a person who is skilled in the art that on some situations it is desirable to transmit multiple shorter transmittable wireless USB transfers instead of a single long one. It is noted that according to an embodiment of the invention, the multiple transmittable wireless USB segments include portions of the received USB transfer which exclude each other.

According to an embodiment of the invention, stage 530 includes stage 532 of generating a supervisory message, which is conveniently used to facilitate communication with either a USB host or a USB function. The use of supervisory messages, such as though not limited to notifications, results of transfers and the like, is familiar to a person who is skilled in the art.

According to an embodiment of the invention, stage 532 includes stage 533 of generating a supervisory message which corresponds to multiple standard control messages, and wherein the transmitting includes transmitting the supervisory message. It is noted that, according to an embodiment of the invention, stage 533 includes generating a supervisory massage which corresponds to both a transmission notification and a result of transmission.

According to an embodiment of the invention, stage 531 includes stage 534 of generating a first notification which is addressed to a driver of the system which is stored in an external system, and wherein the first notification facilitates a generation of a second notification by the driver of the system.

According to an embodiment of the invention, method 500 further includes stage 540 of modifying a memory allocation which is associated with a remote pipe. It is noted that in prior art solutions, a memory allocation has to be allocated to each of the different remote pipes. Conveniently, the HWA driver inquires about a size of the memory unit, and determines the size of the memory allocation which is allocated to each of the remote pipes in the memory unit, wherein, in prior art solutions, the sum of all the memory allocations can not exceed the size of the memory unit. According to an embodiment of the invention, however, stage 540 includes providing to the HWA driver of the host sizes of memory allocations the sum of which is greater than the size of the memory unit (or, according to another embodiment of the invention, to provide to the HWA driver a size of a memory which is greater than the size of the memory unit and to receive the memory allocations from the HWA driver). However, as the HWA driver may in such situation provide data transfers according to said sizes of memory allocations, it is essential that method 500 would be carried out so as to facilitate the transmission of portions of one or more of the transmittable wireless USB transfers before the entire corresponding received transfers is received.

Method 500 continues with stage 550 of transmitting the transmittable wireless USB transfer by wireless communication; wherein at least a portion of the transmittable wireless USB transfer is transmitted before the a completion of a reception of the received USB transfer. Referring to the examples set forth in the previous drawings, the transmitting is conveniently carried out by wireless communication component 240.

As detailed at length in regard to previous drawings, the transmission of the transmittable wireless USB transfer before the completion of a reception of the received USB transfer aids in better utilizing the wireless channel, by bettering the throughput of the wireless channel. Instead of waiting for the entire received USB transfer to be received before initiating the transmission of the transmittable wireless USB transfer, method 500 facilitates an earlier usage of the wireless channel, and thus reducing idle time, in which the wireless channel is left unused.

According to an embodiment of the invention, stage 550 includes stage 551 of transmitting the supervisory message.

It is noted that different embodiments of the invention facilitate different means to further improve the throughput of the wireless channel.

According to an embodiment of the invention, stage 551 includes stage 552 of transmitting the supervisory massage before a completion of a reception of the received USB transfer. This way, a protocol of transmission may be carried further, by reducing unnecessarily postponement of the supervisory message, wherein, as will be clear to a person who is skilled in the art, additional method which are easily implemented by those skilled in the art may be needed in order to troubleshoot potential situations.

According to an embodiment of the invention, stage 551 includes stage 553 of transmitting the supervisory message by a supervisory messages dedicated endpoint. Conveniently, as detailed above, this further improves the throughput of the wireless channel.

According to an embodiment of the invention, stage 550 includes stage 554 of transmitting at least a portion of the transmittable wireless USB transfer without receiving a request for transfer.

According to an embodiment of the invention, stage 550 includes stage 555 of transmitting the transmittable wireless USB transfers of multiple endpoints via another endpoint, wherein, according to an embodiment of the invention, the method includes defining an endpoint via which transmittable wireless USB transfer requests of multiple remote pipes are transmitted.

According to an embodiment of the invention, method 500 supports communication via multiple endpoints and via remote pipes, wherein method 500 further includes allocating (and, according to an embodiment of the invention, reallocating) at least some of the remote pipes to at least some of the multiple endpoints, and so to optimize the communication performance in one or more aspects, such as throughput, latency, quality of service, and so forth.

According to an embodiment of the invention, stage 550 includes stage 556 of transmitting the first notification.

According to an embodiment of the invention, method 500 further includes stage 557 of transmitting a value of one or more values of available transmittable data.

It is noted that when data is transmitted from the USB function to the wireless USB host, channel time allocations are conveniently allocated by the wireless USB host to the different transmittable wireless USB transfer, which are sent via different end points, and according to some embodiments by different USB functions. It is noted that according to the wireless USB standard (WUSB), the channel time allocation is WUSB device receive channel time allocation (WdrCTA) or WUSB device transmit channel time allocation (WdtCTA).

A known problem in the art is, however, that sufficient data is not always available to the host regarding the size of the data which available for transmission, and therefore in some situations superfluous channel time allocation are allocated, which are not fully utilizing the entire channel time allocation, and may even cause events of flow control, thus further increasing the latency and overhead of the transfer, and therefore the throughput of the wireless channel suffers. Some prior art solutions for this problem, which are known to a person who is skilled in the art, are using different parameters such as max-burst size and max-packet size (which according to some situation may be adjusted) and the like for the determination of the channel time allocations.

Therefore, according to an embodiment of the invention, method 500 includes transmitting to the wireless USB host one or more values of available transmittable data, which pertains to available transmittable data in one or more end points. It is noted that conveniently, the wireless USB host to which the one or more values of the available transmittable data are transmitted is adapted to allocate the channel time allocations in response to the one or more values of the available transmittable data. It is further noted that, according to an embodiment of the invention, method 500 further includes the generating of at least one of the one or more values of available transmittable data.

It is noted that, according to different embodiments of the invention, stage 557 includes transmitting the one or more values of the available transmittable data to in different manners such as, though not limited to, device notifications, device notification time slots (DNTS), an addition to a header of a data transmission which is sent via a specific endpoint, and so forth.

Figure 9:
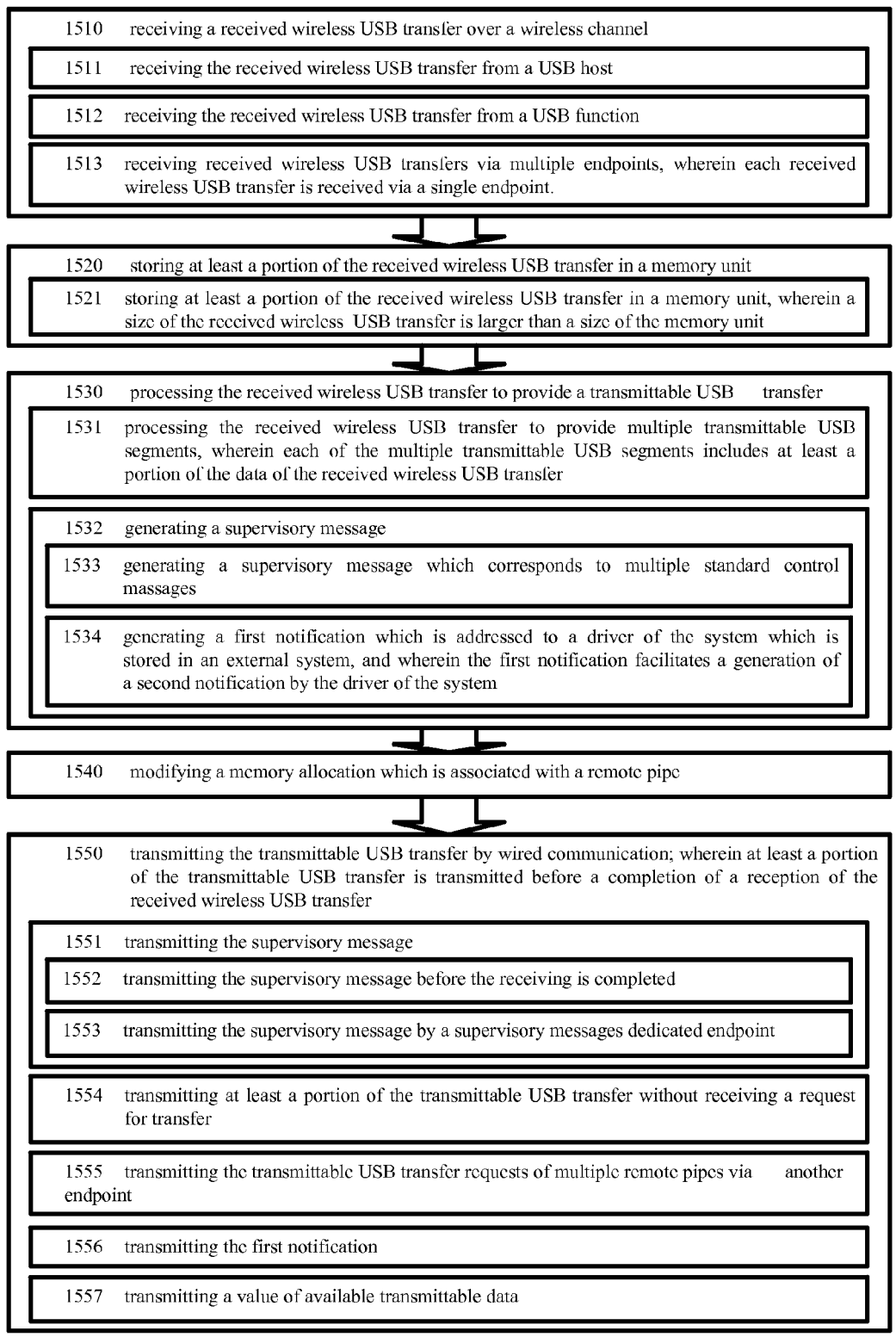
FIG. 9 illustrates a method for transmitting USB communication according to an embodiment of the invention.

FIG. 9 illustrates method 1500 for transmitting USB communication, according to an embodiment of the invention. It is noted that at least some embodiments of method 1500 are adapted to be carried out by systems according to different embodiments of the invention, such as the system which is previously referred to as system 200 in regard to previous drawing. It is further noted that different embodiments of method 1500 are adapted to be utilized by the different embodiments of system 200, and that the details and the examples which were offered in regard to systems according to different embodiments of the invention may be considered as applying for method 1500, where applicable.

It is therefore recommended to a person who is skilled in the art to refer to the previous drawing which illustrate different aspects of the embodiments when reviewing method 1500.

It is further noted that according to some of the embodiments of the invention, method 1500 includes receiving, processing and transmitting of multiple data transfers, wither serially or in at least partially parallel manner.

Method 1500 starts with stage 1510 of receiving a received wireless USB transfer over a wireless channel. Referring to the examples set forward in the previous drawings, stage 1510 is conveniently carried out by 240. Conveniently, the receiving is carried out according to standard USB protocols. It is noted that conveniently, the received wireless USB transfer is a received bulk transfer.

According to an embodiment of the invention, stage 1510 includes stage 1511 of receiving the received wireless USB transfer from a USB host. Conveniently, stage 1511 is carried out by a system which is a device wire adapter, which is adapted to wireless connect the USB function to a USB host.

According to an embodiment of the invention, stage 1510 includes stage 1512 of receiving the received wireless USB transfer from a USB function. Conveniently, stage 1512 is carried out by a system which is a host wire adapter, which is adapted to wireless connect the USB host to a USB function.

According to an embodiment of the invention, stage 1510 includes stage 1513 of receiving the received wireless USB transfers via multiple endpoints, wherein each received USB transfer is received via a single endpoint. The receiving of the received wireless USB transfer via multiple endpoint is advantageous in many aspects, as clear to a person who is skilled in the art, and some of which are discussed previously. Notably, the receiving of the received wireless USB transfer via multiple endpoint at least partially answer problems that may arise from a problematic receiving of the received wireless USB transfer in situations in which stage 1510 includes receiving of multiple received wireless USB transfer simultaneously. Some of the benefits of utilizing multiple endpoints are discussed in regarding to previous drawings.

According to an embodiment of the invention, stage 1510 is followed by stage 1520 of storing at least a portion of the received wireless USB transfer in a memory unit. Referring to the examples set forth in the previous drawings, the storing is conveniently carried out by memory unit 260.

According to an embodiment of the invention, stage 1520 includes stage 1521 of storing the at least a portion of the received wireless USB transfer in a memory unit, wherein a size of the received wireless USB transfer is larger than a size of the memory unit. It is noted that some of the following stages of method 1500 include processing the received wireless USB transfer and transmitting data in response to the outcome of the processing, and therefore it is, according to an embodiment of the invention, no longer necessary to store portions of the received wireless USB transfer which were already processed. It is noted that according to an embodiment of the invention, method 1500 includes handling multiple data transfers, wherein conveniently memory allocations of the memory unit are allocated. According to an embodiment of the invention, stage 1521 includes storing the at least a portion of the received wireless USB transfer in a memory unit according to a memory allocation, wherein a size of the received wireless USB transfer is larger than the memory allocation according to which the received wireless USB transfer is stored.

It should be noted, however, that the size of the received transfer does not have to be larger than the size of the memory unit, and that conveniently, method 1500 facilitates the handling of received wireless USB transfers of different sizes. Moreover, it is clear to a person who is skilled in the art that according to other embodiments of the invention, the size of the memory unit is larger than the size of any single received wireless USB transfer.

It is further clear to a person who is skilled in the art that even if the size of the received wireless USB transfer is smaller than the size of the memory unit, implementation of method 500 is still beneficial in many ways, such as expediting the wireless communication, in shortening latencies, and in increasing the throughput of the wireless channel.

Method 1500 continues with stage 1530 of processing the received wireless USB transfer to provide a transmittable USB transfer. Conveniently, the processing includes processing the received wireless USB transfer which corresponds to a standard USB protocol to provide the transmittable USB transfer, which corresponds to a standard wireless USB standard. It is noted that conveniently, stage 1530 includes retrieving the payload of the received wireless USB transfer, and generating new wireless data packets which are transmittable over the wireless channel, and which form the transmittable USB transfer. Referring to the examples set forth in the previous drawings, the processing is conveniently carried out by processor 220.

It is further noted that according to an embodiment of the invention, the received USB transfer is a bulk transfer, wherein stage 1530 conveniently includes processing the received wireless USB transfer which is a received bulk transfer, conveniently to provide transmittable wireless bulk transfer.

Conveniently, method 1500 further includes storing at least a portion of the transmittable USB transfer in the memory unit, wherein, Referring to the examples set forth in the previous drawings, the storing is conveniently carried out by memory unit 260.

According to an embodiment of the invention, stage 1530 includes stage 1531 of processing the received wireless USB transfer to provide multiple transmittable USB segments, wherein each of the multiple transmittable USB segments includes at least a portion of the data of the received wireless USB transfer. It is clear to a person who is skilled in the art that in some situations it is desirable to transmit multiple shorter transmittable USB transfers instead of a single long one. It is noted that according to an embodiment of the invention, the multiple transmittable USB segments include portions of the received wireless USB transfer which exclude each other.

According to an embodiment of the invention, stage 1530 includes stage 1532 of generating a supervisory message, which is conveniently used to facilitate communication with either a USB host or a USB function. The use of supervisory messages, such as though not limited to notifications, results of transfers and the like, is familiar to a person who is skilled in the art.

According to an embodiment of the invention, stage 1532 includes stage 1533 of generating a supervisory message which corresponds to multiple standard control messages, and wherein the transmitting includes transmitting the supervisory message. It is noted that, according to an embodiment of the invention, stage 1533 includes generating a supervisory massage which corresponds to both a transmission notification and a result of transmission.

According to an embodiment of the invention, stage 1531 includes stage 1534 of generating a first notification which is addressed to a driver of the system which is stored in an external system, and wherein the first notification facilitates a generation of a second notification by the driver of the system.

According to an embodiment of the invention, method 1500 further includes stage 1540 of modifying a memory allocation which is associated with a remote pipe. It is noted that in prior art solutions, a memory allocation has to be allocated to each of the different remote pipes. Conveniently, the HWA driver inquires about a size of the memory unit, and determines the size of the memory allocation which is allocated to each of the remote pipes in the memory unit, wherein, in prior art solutions, the sum of all the memory allocations can not exceed the size of the memory unit. According to an embodiment of the invention, however, stage 1540 includes providing to the HWA driver of the host sizes of memory allocations the sum of which is greater than the size of the memory unit (or, according to another embodiment of the invention, to provide to the HWA driver a size of a memory which is greater than the size of the memory unit and to receive the memory allocations from the HWA driver). However, as the HWA driver may in such situation provide data transfers according to said sizes of memory allocations, it is essential that method 1500 would be carried out so as to facilitate the transmission of portions of one or more of the transmittable USB transfers before the entire corresponding received transfers is received.

Method 1500 continues with stage 1550 of transmitting the transmittable USB transfer by wireless communication; wherein at least a portion of the transmittable USB transfer is transmitted before the completion of a reception of the received wireless USB transfer. Referring to the examples set forth in the previous drawings, the transmitting is conveniently carried out by wired communication component 230.

As detailed at length in regard to previous drawings, the transmission of the transmittable USB transfer before the completion of a reception of the received wireless USB transfer aids in better utilizing the wireless channel, by bettering the throughput of the wireless channel. Instead of waiting for the entire received wireless USB transfer to be received before initiating the transmission of the transmittable USB transfer, method 1500 facilitates an earlier usage of the wireless channel, and thus reducing idle time, in which the wireless channel is left unused.

According to an embodiment of the invention, stage 1550 includes stage 1551 of transmitting the supervisory message.

It is noted that different embodiments of the invention facilitate different means to further improve the throughput of the wireless channel.

According to an embodiment of the invention, stage 1551 includes stage 1552 of transmitting the supervisory massage before the completion of a reception of the received wireless USB transfer. This way, a protocol of transmission may be carried further, by reducing unnecessarily postponement of the supervisory message, wherein, as will be clear to a person who is skilled in the art, additional method which are easily implemented by those skilled in the art may be needed in order to troubleshoot potential situations.

According to an embodiment of the invention, stage 1551 includes stage 1553 of transmitting the supervisory message by a supervisory messages dedicated endpoint. Conveniently, as detailed above, this further improves the throughput of the wireless channel.

According to an embodiment of the invention, stage 1550 includes stage 1554 of transmitting at least a portion of the transmittable USB transfer without receiving a request for transfer.

According to an embodiment of the invention, stage 1550 includes stage 1555 of transmitting the transmittable USB transfer requests of multiple endpoints via another endpoint, wherein, according to an embodiment of the invention, the method includes defining an endpoint via which transmittable USB transfer requests of multiple remote pipes are transmitted.

According to an embodiment of the invention, method 1500 supports communication via multiple endpoints and via remote pipes, wherein method 1500 further includes allocating (and, according to an embodiment of the invention, reallocating) at least some of the remote pipes to at least some of the multiple endpoints, and so to optimize the communication performance in one or more aspects, such as throughput, latency, quality of service, and so forth.

According to an embodiment of the invention, stage 1550 includes stage 1556 of transmitting the first notification.

According to an embodiment of the invention, method 1500 further includes stage 1557 of transmitting a value of one or more values of available transmittable data.

It is noted that when data is transmitted from the USB function to the wireless USB host, channel time allocations are conveniently allocated by the wireless USB host to the different transmittable wireless USB transfer, which are send via different end points, and according to some embodiments by different USB functions. It is noted that according to the wireless USB standard (WUSB), the channel time allocation is WUSB device receive channel time allocation (WdrCTA) or WUSB device transmit channel time allocation (WdtCTA).

A known problem in the art is, however, that sufficient data is not always available to the host regarding the size of the data which available for transmission, and therefore in some situations superfluous channel time allocation are allocated, which are not fully utilizing the entire channel time allocation, and therefore the throughput of the wireless channel suffers. Some prior art solutions for this problem, which are known to a person who is skilled in the art, are using different parameters such as max-burst size and max-packet size (which according to some situation may be adjusted) and the like for the determination of the channel time allocations.

Therefore, according to an embodiment of the invention, method 1500 includes transmitting to the wireless USB host one or more values of available transmittable data, which pertains to available transmittable data in one or more end points. It is noted that conveniently, the wireless USB host to which the one or more values of the available transmittable data are transmitted is adapted to allocate the channel time allocations in response to the one or more values of the available transmittable data. It is further noted that, according to an embodiment of the invention, method 1500 further includes the generating of at least one of the one or more values of available transmittable data.

It is noted that, according to different embodiments of the invention, stage 1557 includes transmitting the one or more values of the available transmittable data to in different manners such as, though not limited to, device notifications using device notification time slots (DNTS), an addition to a header of a data transmission which is sent via a specific endpoint, and so forth.

It is noted that according to an embodiment of the invention, method 500 and method 1500 are carried on at least partially simultaneously.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A universal serial bus (USB) communication system, the system comprises:
   a wired communication component, which is adapted to receive a received USB transfer;
   a processor which is adapted to process the received USB transfer to provide a transmittable wireless USB transfer;
   a wireless communication component, which is adapted to transmit the transmittable wireless USB transfer;
   wherein the wireless communication component is adapted to transmit a portion of the transmittable wireless USB transfer before the entire received USB transfer is received.

2. The system according to claim 1, wherein the received USB transfer is a bulk transfer.

3. The system according to claim 1, wherein the wired communication component is adapted to receive the received USB transfer from a USB host.

4. The system according to claim 1, wherein the wired communication component is adapted to receive the received USB transfer from a USB function.

5. The system according to claim 1, further comprising a memory unit which is adapted to store at least a portion of the received USB transfer, wherein a size of the received transfer is larger than a size of the memory unit.

6. The system according to claim 1, wherein (a) the wireless communication component is adapted to receive a received wireless USB transfer; (b) the processor is adapted to process the received wireless USB transfer to provide a transmittable USB transfer; (c) the wired communication component is adapted to transmit the transmittable USB transfer; and (d) the wireless communication component is adapted to transmit a portion of the transmittable USB transfer before the entire received USB transfer is received.

7. The system according to claim 1, wherein the processor is adapted to generate and to transmit a supervisory message before the entire received USB transfer is received.

8. The system according to claim 7, wherein the processor is adapted to generate and to transmit a supervisory message which corresponds to multiple standard control messages.

9. The system according to claim 1, further adapted to process the received USB transfer to provide multiple transmittable wireless USB segments, wherein each of the multiple transmittable wireless USB segments comprises at least a portion of the data of the received USB transfer.

10. The system according to claim 1, further comprising a memory unit which is adapted to store at least a portion of the received USB transfer, wherein the system is adapted to modify a memory allocation which is associated with a remote pipe.

11. The system according to claim 1, further adapted to receive received USB transfers via multiple endpoints, wherein each received USB transfer is received via a single endpoint.

12. The system according to claim 1, further adapted to generate and to transmit a first notification which is addressed to a driver of the system which is stored in an external system, and wherein the first notification facilitates a generation of a second notification by the driver of the system.

13. The system according to claim 1, further adapted to transmit a value of available transmittable data, wherein the value of the available transmittable data is usable in an allocation of a channel time allocation.

14. A method for wirelessly transmitting USB communication, the method comprises:
   Receiving over a wired channel a received USB transfer;
   processing the received USB transfer to provide a transmittable wireless USB transfer;
   transmitting the transmittable wireless USB transfer by wireless communication; wherein at least a portion of the transmittable wireless USB transfer is being transmitted before a completion of a reception of the received USB transfer.

15. The method according to claim 14, wherein the receiving comprises receiving the received USB transfer from a USB host.

16. The method according to claim 14, wherein the receiving comprises receiving the received USB transfer from a USB function.

17. The method according to claim 14, further comprising storing at least a portion of the received USB transfer in a memory unit, wherein a size of the received USB transfer is larger than a size of the memory unit.

18. The method according to claim 14, wherein the receiving comprises receiving a received wireless USB transfer by wireless communication; the processing comprises processing the received wireless USB transfer to provide a transmittable USB transfer, the transmitting comprises transmitting the transmittable USB transfer over a wired channel, and wherein at least a portion of the transmittable wired USB transfer is transmitted before a completion of a reception of the received wireless USB transfer.

19. The method according to claim 14, wherein the processing comprises generating a supervisory message, and wherein the transmitting comprises transmitting the supervisory message before the a completion of a reception of the received USB transfer.

20. The method according to claim 14, wherein the processing comprises generating a supervisory message which corresponds to multiple standard control messages, and wherein the transmitting comprises transmitting the supervisory message.

21. The method according to claim 14, wherein the processing comprises processing the received USB transfer to provide multiple transmittable wireless USB segments, wherein each of the multiple transmittable wireless USB segments comprise at least a portion of the data of the received USB transfer.

22. The method according to claim 14, further comprising modifying a memory allocation which is associated with a remote pipe.

23. The method according to claim 14, wherein the transmitting comprises transmitting a supervisory message by a supervisory messages dedicated endpoint.

24. The method according to claim 14, further comprising generating a first notification which is addressed to a driver of the system which is stored in an external system, and wherein the first notification facilitates a generation of a second notification by the driver of the system, and wherein the transmitting comprises transmitting the first notification.

25. The method according to claim 14, further comprising transmitting a value of available transmittable data, wherein the value of the available transmittable data is usable in an allocation of a channel time allocation.

* * * * *